US012132940B2

(12) United States Patent
Okada

(10) Patent No.: US 12,132,940 B2
(45) Date of Patent: Oct. 29, 2024

(54) MANAGEMENT SERVER

(71) Applicant: ALIEN MUSIC ENTERPRISE INC., Tokyo (JP)

(72) Inventor: Munehisa Okada, Tokyo (JP)

(73) Assignee: ALIEN MUSIC ENTERPRISE INC., Tokyo (JP)

( * ) Notice: Subject to any disclaimer, the term of this patent is extended or adjusted under 35 U.S.C. 154(b) by 0 days.

(21) Appl. No.: 18/258,318

(22) PCT Filed: Jun. 11, 2021

(86) PCT No.: PCT/JP2021/022285
§ 371 (c)(1),
(2) Date: Jun. 19, 2023

(87) PCT Pub. No.: WO2022/137606
PCT Pub. Date: Jun. 30, 2022

(65) Prior Publication Data
US 2024/0031618 A1  Jan. 25, 2024

(30) Foreign Application Priority Data

Dec. 22, 2020 (JP) .................................. 2020-212642

(51) Int. Cl.
*H04N 21/233* (2011.01)
*H04N 21/218* (2011.01)
*H04N 21/482* (2011.01)

(52) U.S. Cl.
CPC ..... *H04N 21/233* (2013.01); *H04N 21/21805* (2013.01); *H04N 21/482* (2013.01)

(58) Field of Classification Search
CPC ........... H04N 21/233; H04N 21/21805; H04N 21/482; H04N 21/24; H04N 21/2668; H04N 21/2743; G06F 13/00
See application file for complete search history.

(56) References Cited

U.S. PATENT DOCUMENTS 7,526,790 B1 * 4/2009 Vesikivi .................. H04S 7/302
725/135
2008/0317260 A1 * 12/2008 Short ....................... G10L 21/02
381/92

(Continued)

FOREIGN PATENT DOCUMENTS

JP    2003-219389 A    7/2003
JP    2008-131379 A    6/2008

(Continued)

OTHER PUBLICATIONS

WIPO, International Search Report for International Application No. PCT/JP2021/022285, Aug. 31, 2021.

*Primary Examiner* — Oschta I Montoya

(57) ABSTRACT

[Summary]
[Problem to be Solved]
To construct a management server that can provide video and audio according to the position, where a camera films, to user terminals.
[Solution]
It is configured that a management server comprises a camera extraction section receiving a desired camera from a user terminal, an audio extraction section receiving audio generation data from a distributor terminal, a video extraction section receiving video generation data corresponding to a filming subject from the distributor terminal, a distribution audio generation section generating distribution audio to be distributed to the user terminal, a video generation section generating distribution video to be distributed to the user terminal based on the video of the filming subject and the distribution audio.

5 Claims, 20 Drawing Sheets

(56) References Cited

U.S. PATENT DOCUMENTS

| | | | |
|---|---|---|---|
| 2012/0082323 A1* | 4/2012 | Sato | G10L 21/0272 |
| | | | 381/94.3 |
| 2013/0321568 A1 | 12/2013 | Suzuki et al. | |
| 2017/0127035 A1 | 5/2017 | Kon et al. | |
| 2017/0169540 A1 | 6/2017 | Satori et al. | |
| 2018/0343442 A1* | 11/2018 | Yoshikawa | H04N 21/438 |
| 2020/0053395 A1 | 2/2020 | Mukaiyama et al. | |

FOREIGN PATENT DOCUMENTS

| | | |
|---|---|---|
| JP | 2013-250838 A | 12/2013 |
| JP | 5777185 B1 | 9/2015 |
| JP | 2016-165162 A | 9/2016 |
| JP | 2018117312 A | 7/2018 |
| JP | 2020-167629 A | 10/2020 |
| WO | 2015/162947 A1 | 10/2015 |

\* cited by examiner

FIG. 2A

USER INFORMATION 200

| USER ID | USER NAME | AGE, GENDER | VIEWING HISTORY | DESIRED DISTRIBUTION SCREEN INFORMATION | ... |
|---|---|---|---|---|---|
| A0001 | ○○○ | 21 YEARS OLD, FEMALE | 1. XXX---<br>2. XXX---<br>---. XXX--- | 1. XXX---<br>2. XXX---<br>---. XXX--- | ... |
| A0002 | ○○○ | 35 YEARS OLD, MALE | 1. XXX---<br>2. XXX---<br>---. XXX--- | 1. XXX---<br>2. XXX---<br>---. XXX--- | ... |
| A0003 | ○○○ | 17 YEARS OLD, MALE | 1. XXX---<br>2. XXX---<br>---. XXX--- | 1. XXX---<br>2. XXX---<br>---. XXX--- | ... |
| ... | ... | ... | ... | ... | ... |

DESIRED DISTRIBUTION SCREEN INFORMATION 210

USER ID : A0001

| REQUEST ID | VIEWING DATE AND TIME | DISTRIBUTOR ID | DISTRIBUTION SCREEN ID | DESIRED CAMERA | ... |
|---|---|---|---|---|---|
| R0001 | NOV. 18, '20, 21:00 | B0001 | M0001 | Ct | ... |
| R0002 | NOV. 25, '20, 19:00 | B0001 | M0002 | Cg | ... |
| R0003 | NOV. 25, '20, 19:00 | B0001 | M0003 | Cd | ... |
| ... | ... | ... | ... | ... | ... |

FIG. 3A

DISTRIBUTOR INFORMATION 300

| DISTRIBUTOR ID | DISTRIBUTOR NAME | DISTRIBUTION SCREEN INFORMATION | AUDIO GENERATION DATA | VIDEO GENERATION DATA | ... |
|---|---|---|---|---|---|
| B0001 | ●●● | 1. DISTRIBUTION SCREEN ID<br>2. DISTRIBUTION DATE AND TIME<br>... X X X ... | 1. X X X ...<br>2. X X X ...<br>... X X X ... | 1. X X X ...<br>2. X X X ...<br>... X X X ... | ... |
| B0002 | ●●● | 1. DISTRIBUTION SCREEN ID<br>2. DISTRIBUTION DATE AND TIME<br>... X X X ... | 1. X X X ...<br>2. X X X ...<br>... X X X ... | 1. X X X ...<br>2. X X X ...<br>... X X X ... | ... |
| B0003 | ●●● | 1. DISTRIBUTION SCREEN ID<br>2. DISTRIBUTION DATE AND TIME<br>... X X X ... | 1. X X X ...<br>2. X X X ...<br>... X X X ... | 1. X X X ...<br>2. X X X ...<br>... X X X ... | ... |
| ... | ... | ... | ... | ... | ... |

310 (points to AUDIO GENERATION DATA column)

FIG. 3B

AUDIO GENERATION DATA 310

| DATA ID | MICROPHONE INFORMATION | MICROPHONE POSITON INFORMATION | CAMERA INFORMATION | CAMERA POSITION INFORMATION | ... |
|---|---|---|---|---|---|
| D0001 | 1. for Vo<br>2. for Gt<br>... ...... | 1. Vo (x=..., y=...)<br>2. Gt (x=..., y=...)<br>..., ...... | 1. C t<br>2. C g<br>..., ...... | 1. Ct (x=..., y=...)<br>2. Cg (x=..., y=...)<br>..., ...... | ... |
| D0002 | 1. for Vo<br>2. for Gt<br>... ...... | 1. Vo (x=..., y=...)<br>2. Gt (x=..., y=...)<br>..., ...... | 1. C t<br>2. C g<br>..., ...... | 1. Ct (x=..., y=...)<br>2. Cg (x=..., y=...)<br>..., ...... | ... |
| D0003 | 1. for Vo<br>2. for Gt<br>... ...... | 1. Vo (x=..., y=...)<br>2. Gt (x=..., y=...)<br>..., ...... | 1. C t<br>2. C b<br>..., ...... | 1. Ct (x=..., y=...)<br>2. Cb (x=..., y=...)<br>..., ...... | ... |
| ... | ... | ... | ... | ... | ... |

FIG. 7B

| CAMERA | CAMERA POSITION | MICROPHONE | MICROPHONE POSITION | DISTANCE | AUDIO TRACK COEFFICIENT $\alpha$ | DISTRIBUTION AUDIO |
|---|---|---|---|---|---|---|
| Ct | x=... y=... | FOR Vo | x=... y=... | L1=3.0m | 1.00 | Ht |
| | | FOR Gt | x=... y=... | L2=5.0m | 0.60 | |
| | | ... | ... | ... | ... | |
| Cg | x=... y=... | ... | ... | ... | ... | Hg |
| ... | ... | ... | ... | ... | ... | ... |

MANAGEMENT SERVER

TECHNICAL FIELD

This disclosure relates to a management server connected to user terminals and distributor terminals via a network.

BACKGROUND ART

Conventionally, when viewing an online distributed video of a live concert, a distributor switching between videos filmed by a plurality of cameras allows users to watch the video from a plurality of viewpoints.

However, as for the audio, users could not experience the realistic sound that should be heard differently from each arbitrary viewpoint in a live concert venue, because the users hear a single sound that has been mixed regardless of the camera switching. For example, Patent Literature 1 discloses a system that acquires audio data obtained when video data is acquired and processes the audio data appropriately according to the status of the video data.

CITATION LIST

Patent Literature

[Patent Literature 1] JP2018-117312A

SUMMARY OF THE INVENTION

Problems to be Solved by the Invention

The inventor of the present application recognized the problem that the system described in Patent Literature 1 is not possible to provide an appropriate visualization for a sound actually heard at the camera position and a video according to the camera position to a user terminal.

The objective of the present disclosure is to provide a management server capable of aligning videos at the position of a filming subject by a camera and audio according to the position of the filming subject, following the location of the filming subject.

Means for Solving the Problems

This disclosure is a management server that is connected to a user terminal and a distributor terminal via a network, the management server comprises: a camera extraction section receiving a desired camera, which is selected by a user by operating the user terminal, from the user terminal; an audio extraction section receiving audio generation data, which is audio acquired by microphones of audio corresponding to a filming subject to be filmed by the desired camera, from the distributor terminal, the audio generation data is acquired by microphones of audio corresponding to a filming subject to be filmed by the desired camera; a video extraction section receiving video generation data corresponding to the filming subject from the distributor terminal; a distribution audio generation section generating distribution audio to be distributed to the user terminal by calculating a distance from the desired camera to the filming subject and multiplying the voice generation data by a coefficient determined according to the distance; and a distribution video generation section generating distribution video to be distributed to the user terminal based on the video of the filming subject and the distribution audio.

Effect of the Invention

According to this disclosure, the management server can provide audio heard at the position of the desired camera along with video according to the position of the desired camera and can provide audio at the position of the filming subject by the camera.

BRIEF DESCRIPTION OF DRAWINGS

FIG. 2A A drawing that shows an overview of the user information stored in the user information storage section of the management server in one embodiment of the present disclosure.

FIG. 2B A drawing that shows an overview of the desired distribution screen information.

FIG. 3A A drawing that shows an overview of the distributor information stored in the distributor information storage section of the management server in one embodiment of the present disclosure.

FIG. 3B A drawing that shows an overview of the voice generation data.

FIG. 7B A chart that shows the relationship between the position information of each camera, the distance from each camera to each microphone, and the audio track coefficients.

MODES FOR CARRYING OUT THE INVENTION

Hereinafter, a description will be given of a preferred mode for carrying out the present disclosure with reference to the drawings. It is to be noted that this is merely an example and that the technical scope of the present disclosure shall not be limited thereto. In all drawings for explaining the embodiments, the same part is, in principle, marked with the same symbol, and redundant descriptions thereof are omitted.

First Embodiment

<System Configuration>

Figure 1:
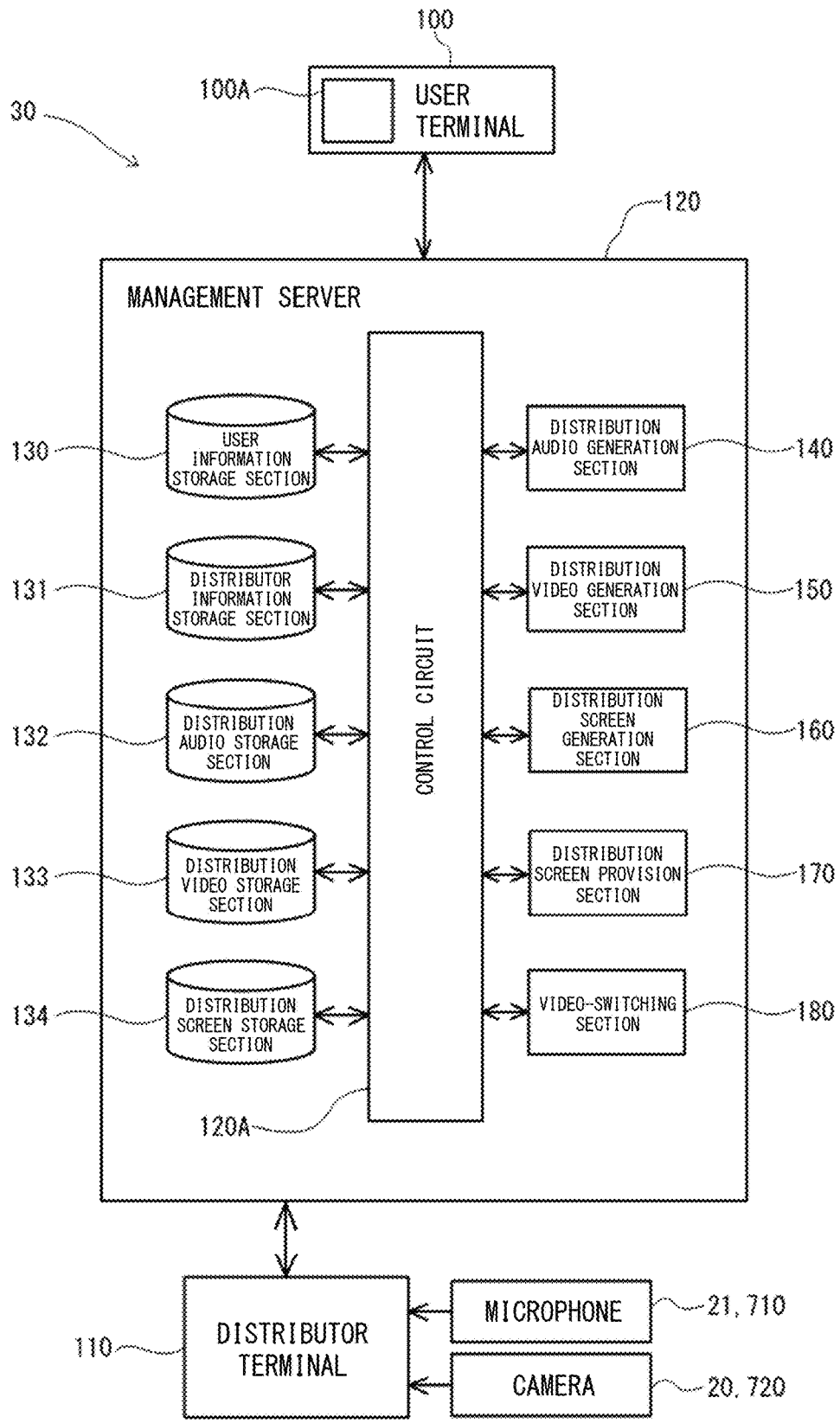
FIG. 1 A drawing that shows an overview of an example configuration of a live screen provision system in one embodiment of the present disclosure.

FIG. 1 is a drawing that shows an overview of an example configuration of a live screen provision system 30 in an embodiment of the present disclosure.

As shown in FIG. 1, the live screen provision system 30 has a user terminal 100, a distributor terminal 110, and a management server 120 connected to a user terminal 100 and a distributor terminal 110 via networks. The networks include those built by either wireless or wired and those built by both wireless and wired. Although a plurality of user terminals 100 can be connected to the management server 120, FIG. 1 shows a single user terminal 100 for convenience.

The management server 120 has control circuit 120A, user information storage section 130, distributor information storage section 131, distribution audio storage section 132, distribution video storage section 133, distribution screen storage 134, distribution audio generation section 140, distribution video generation section 150, distribution screen generation section 160, distribution screen provision section 170, and video-switching section 180. The control circuit 120A is a computer having a communication section, input ports, output ports, a central processing unit, comparison circuits, and the like. The signals sent from the user terminal 100 and the distributor terminal 110 are input to the input port via the communication section. The signals output from the control circuit 120A are sent to the user terminal 100 and the distributor terminal 110 via the output port and the communication section. The above-referenced signals are electrical signals containing information, data, video, images, audio, and the like.

Signals are transferred between the control circuit 120A, the user information storage section 130, the distributor information storage section 131, the distribution audio storage section 132, the distribution video storage section 133, the distribution screen storage section 134, the distribution audio generation section 140, the distribution video generation section 150, the distribution screen generation section 160, the distribution screen provision section 170, and the video-switching section 180. The control circuit 120A controls, manages, and monitors the user information storage section 130, the distributor information storage section 131, the distribution audio storage section 132, the distribution video storage section 133, the distribution screen storage section 134, the distribution audio generation section 140, the distribution video generation section 150, the distribution screen generation section 160, the distribution screen provision section 170, and the video-switching section 180.

User information 200 (see below, FIG. 2A), which is sent from the user terminal 100, is stored in the user information storage section 130. Distributor information 300 (see below, FIG. 3A), which is sent from the distributor terminal 110, is stored in the distributor information storage section 131. Distribution audio 800 (see below, FIG. 7A, FIG. 7B, FIG. 7C, and FIG. 8) is stored in the distribution audio storage section 132. The distribution video 900 (see below, FIG. 9) is stored in the distribution video storage section 133. distribution screen 1000 (see below, FIG. 10) and post-switching screen 1300 (see below, FIG. 13) is stored in the distribution screen storage section 134.

The distribution audio generation section 140 generates distribution audio 800 by extracting desired camera 200 based on the user information 200 stored in the user information storage section 130, acquiring distributor information 300 from the distributor terminal 110, extracting audio generation data 310 from the distributor information 300, extracting camera position information and microphone position information corresponding to the desired camera 220 from the audio generation data 310, calculating distances from each microphone by the camera position information and the microphone position information, calculating a reciprocal of a quotient obtained by dividing the distance from each microphone by the distances from the vocal microphone as audio track coefficient, and mixing each of track sounds obtained by multiplying the volume of each of the track sounds collected by each of microphones by the audio track coefficient.

The distribution video generation section 150 generates distribution video 900 based on the distributor information 300 and the distribution audio 800 obtained by referring to the desired camera 220. The distribution screen generation section 160 generates a distribution screen 1000 based on the distribution audio 800 and distribution video 900. The distribution screen provision section 170 provides the generated distribution screen 1000 to the user terminal 100.

<User Information Storage Section>

FIG. 2A is a drawing that shows an overview of an example configuration of the user information 200 stored in the user information storage section 130 of the management server 120 in one embodiment of the present disclosure. As shown in FIG. 2A, user information 200 consists of items such as user ID, user name, age, address, viewing history, desired distribution screen information 210, and the like. The user ID indicates the code by which the management server 120 identifies the user. The user name indicates the name of the user. The address indicates the address of the user.

FIG. 2B is a drawing that shows an overview of an example configuration of the desired distribution screen information 210 of the management server 120 in one embodiment of the present disclosure. The desired distribution screen information 210 indicates information such as the request ID, viewing date and time, distributor ID, distribution screen ID, desired camera 220, and the like.

The request ID indicates a code by which the management server 120 identifies the request of a user. The viewing date and time indicate the date and time when the user wishes to view the distribution screen 1000 (see below for details). The distributor ID indicates a code to identify the distributor. The distribution screen ID indicates a code to identify the distribution screen 1000.

The "desired camera 220" indicates the camera at the filming position where the user requests to view among a plurality of cameras that are filming the video to be viewed on the distribution screen 1000. The desired camera 220 is selected by the user operating the user terminal 100.

Figure 7A:
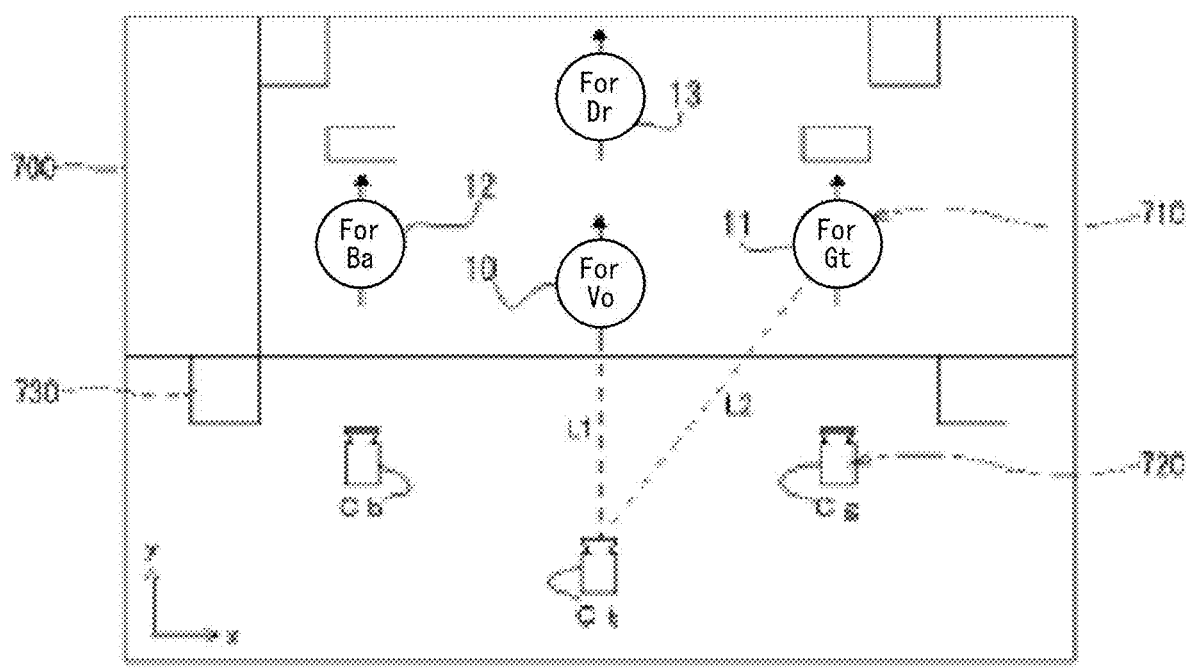
FIG. 7A A plan view of the stage and the venue when the video to be distributed is a live concert.

For example, the desired camera 220 indicates a camera selected by the user from cameras such as a camera that captures the entire stage (Ct), a camera that captures a close-up of the vocalist (Cb), and a camera that captures a close-up of the guitarist (Cg) and the like, as shown in FIG. 7A. Thus, when the user requests to watch the video filmed by a "camera that captures the entire stage" (Ct), for example, the desired camera 220 at this time is "Ct". Cameras Ct, Cb, and Cg have different positions in venue 700.

<Distributor Information Storage Section>

FIG. 3A is a drawing that shows an overview of the distributor information 300 stored in the distributor information storage section 131 of the management server 120 in one embodiment of the present disclosure.

As shown in FIG. 3A, distributor information 300 consists of items such as distributor ID, distributor name, distribution screen information, audio generation data 310, video generation data, and the like.

The distributor ID indicates the code by which the management server 120 identifies the distributor. The distributor name indicates the name of the distributor. The distribution screen information indicates information such as the distribution screen ID, distribution date and time, and the like.

The video generation data indicates information for the management server 120 to generate the video to be displayed on the distribution screen 1000. For example, the video generation data includes various data such as information about the camera corresponding to the desired camera 220, the video filming the filming subject, the quality of the video, and the like. The filming subject can also be defined as the filming target.

As shown in FIG. 3B, audio generation data 310 consists of items such as data ID, microphone information, microphone position information, camera information, camera position information, and the like. The data ID indicates the code by which the management server 120 identifies the audio generation data 310.

The microphone information indicates information such as the type of microphone used by the distributor for distribution, the voice collection target, the name and attributes of the microphone, and the like. For example, when the microphones used by the distributor for distribution are four microphones that collect the sounds of a vocalist, a guitar, a bass guitar, and drums, the microphone information for the microphones is indicated as follows: a microphone for Vo 10 (microphone for the vocalist) is "for Vo", a microphone for Gt 11 is "for Gt", microphone for Ba 12 is "for Ba", microphone for Dr 13 is "for Dr", and the like in FIG. 7A. The microphone for Vo 10, the microphone for Gt 11, the microphone for Ba 12, and the microphone for Dr 13 have different positions in the venue 700.

The microphone position information indicates information about the position of the microphone. For example, the microphone position information is represented by using planar coordinates. In other words, the microphone position information for "microphone for Vo 10" is indicated as "x=OO, y=OO".

The camera information indicates information such as the type of camera used by the distributor for distribution, the filming subject, the name and attributes of the camera, and the like. For example, when the cameras used by the distributor for distribution are five cameras that capture the entire stage, vocalist, guitarist, bassist, and drummer, the camera information for the cameras is indicated as "Ct," "Cv," "Cb," "Cd," and the like.

The camera position information indicates information about the position of the camera. For example, the camera position information is represented using planar coordinates. In other words, the camera position information for "Ct" is indicated as "x=OO, y=OO".

Therefore, by obtaining the microphone information, microphone position information, camera information, and camera position information, the management server 120 can calculate the distance to each microphone for any given camera. By using the calculated distance, the management server 120 can generate distribution voices 800 (details are described below).

<Overall Process>

Figure 4:
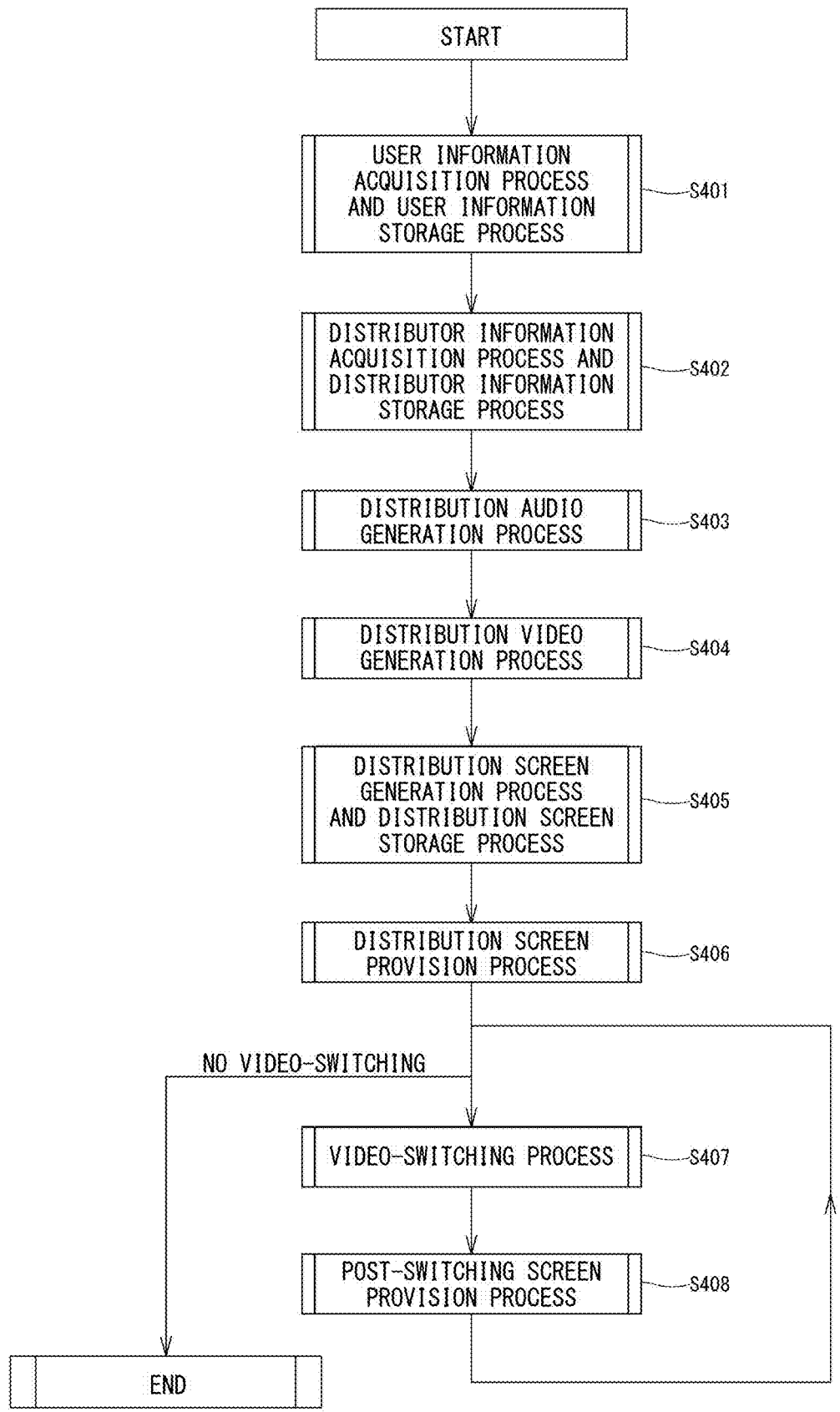
FIG. 4 A flowchart diagram that shows an overview of the overall process in one embodiment of the present disclosure.

FIG. 4 is a drawing that shows an overview of the overall process in one embodiment of the present disclosure.

First, in step S401, the management server 120 performs the user information acquisition process and the user information storage process (described below in FIG. 5). First, in step S402, the management server 120 performs the distributor information acquisition process and the distributor information storage process (described below in FIG. 6).

Next, in step S403, the management server 120 performs the distribution audio generation process (described below in FIG. 7 and FIG. 8). Next, in step S404, the management server 120 performs the distribution video generation process (described below in FIG. 9). Next, in step S405, the management server 120 performs the distribution screen generation process and distribution screen storage process (described below in FIG. 10 and FIG. 11). Next, in step S406, the management server 120 performs the distribution screen provision process (described below in FIG. 12).

Next, when the user switches the video, in step S407, the management server 120 performs the video-switching process (described below in FIG. 13 and FIG. 14). Next, in step S408, the management server 120 performs the post-switching screen provision process (described below in FIG. 15).

<User Information Storage Process>

Figure 5:
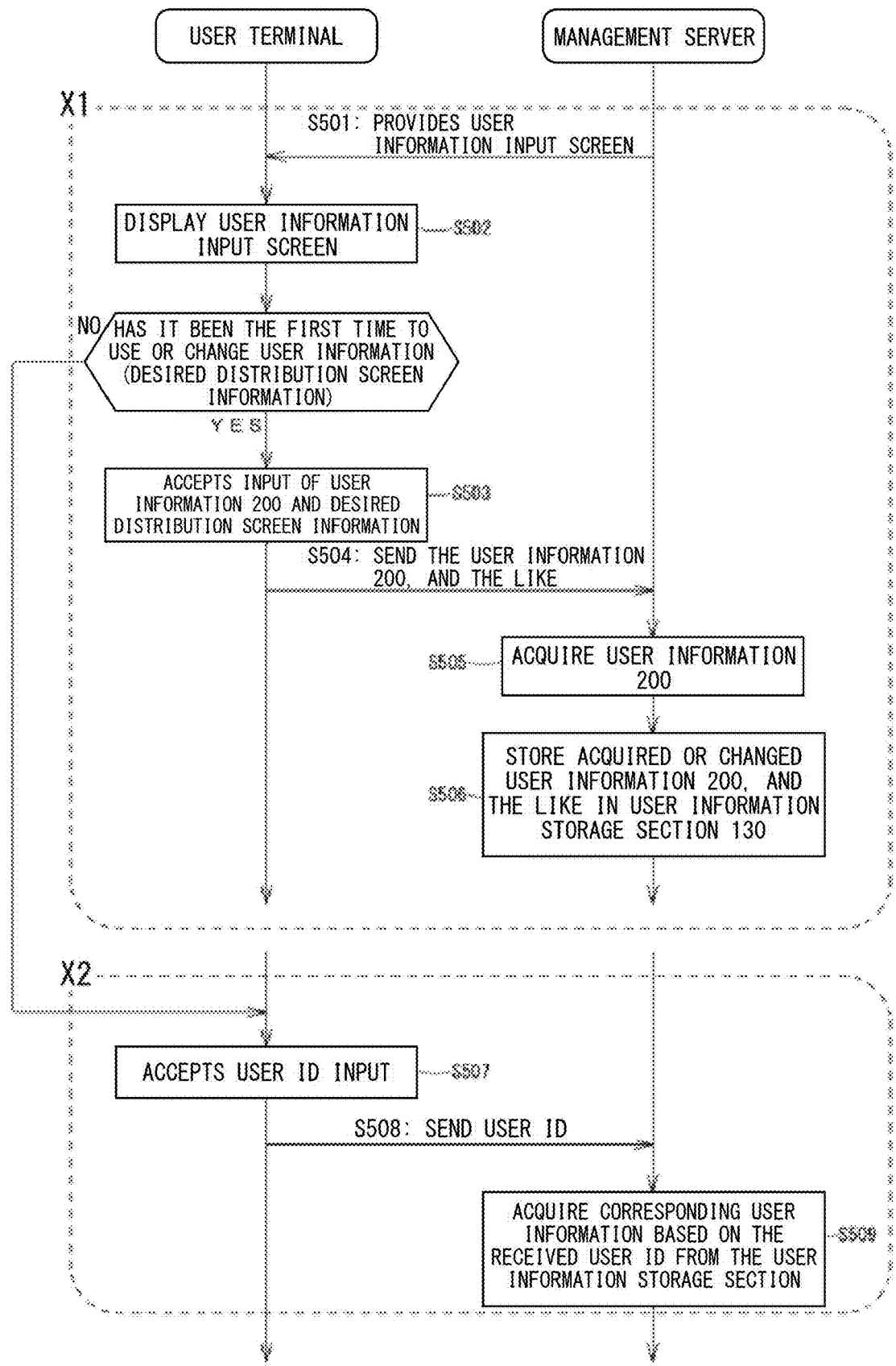
FIG. 5 A drawing that shows an overview of the user information acquisition process and user information storage process in one embodiment of the present disclosure.

Within area X1 enclosed by dashed lines in FIG. 5, an overview of the user information storage process performed in step S401 of FIG. 4 is shown. The following describes how the management server 120 stores the user information 200.

First, in step S501, the management server 120 provides a user information input screen to the user terminal 100. Next, in step S502, the user terminal 100 displays the user information input screen on the display 100A.

Then, when the user uses the live screen provision system 30 for the first time or changes (updates) the desired distribution screen information 210, in step S503, the user terminal 100 accepts input of the user information 200 from the user. The user information 200 accepted from the user at this moment includes the desired distribution screen information 210. The information entered by the user may also include login information for external accounts (e.g., SNS) or passwords.

Next, in step S504, the user terminal 100 sends the user information 200, whose input was accepted in step S503, to the management server 120. Next, in step S505, the management server 120 receives the user information 200 sent in step S504, whereby the control circuit 120A obtains the user information 200.

Next, in step S506, the control circuit 120A attaches a user ID to the acquired or changed user information 200 and stores the user information 200, whose input was accepted in step S503, in the user information storage section 130.

<User Information Acquisition Process>

Within area X2 enclosed by dashed lines in FIG. 5, an overview of the user information acquisition process in one embodiment of the present disclosure is shown. The following describes how the management server 120 acquires the user information 200.

When the user uses the live screen provision system 30 for the second or subsequent time, the user terminal 100 accepts input of the user ID from the user in step S507. Further, the user ID is included in the user information 200.

Next, in step S508, the user terminal 100 sends the user ID, whose input was accepted in step S507, to the management server 120.

Then, in step S509, the management server 120 acquires the user information 200 corresponding to the key of the user ID sent in step S508 from the user information storage section 130. The process of step S505, step S506, and step S509 corresponds to the process of step S401 in FIG. 4.

<Distributor Information Storage Process>

Figure 6:
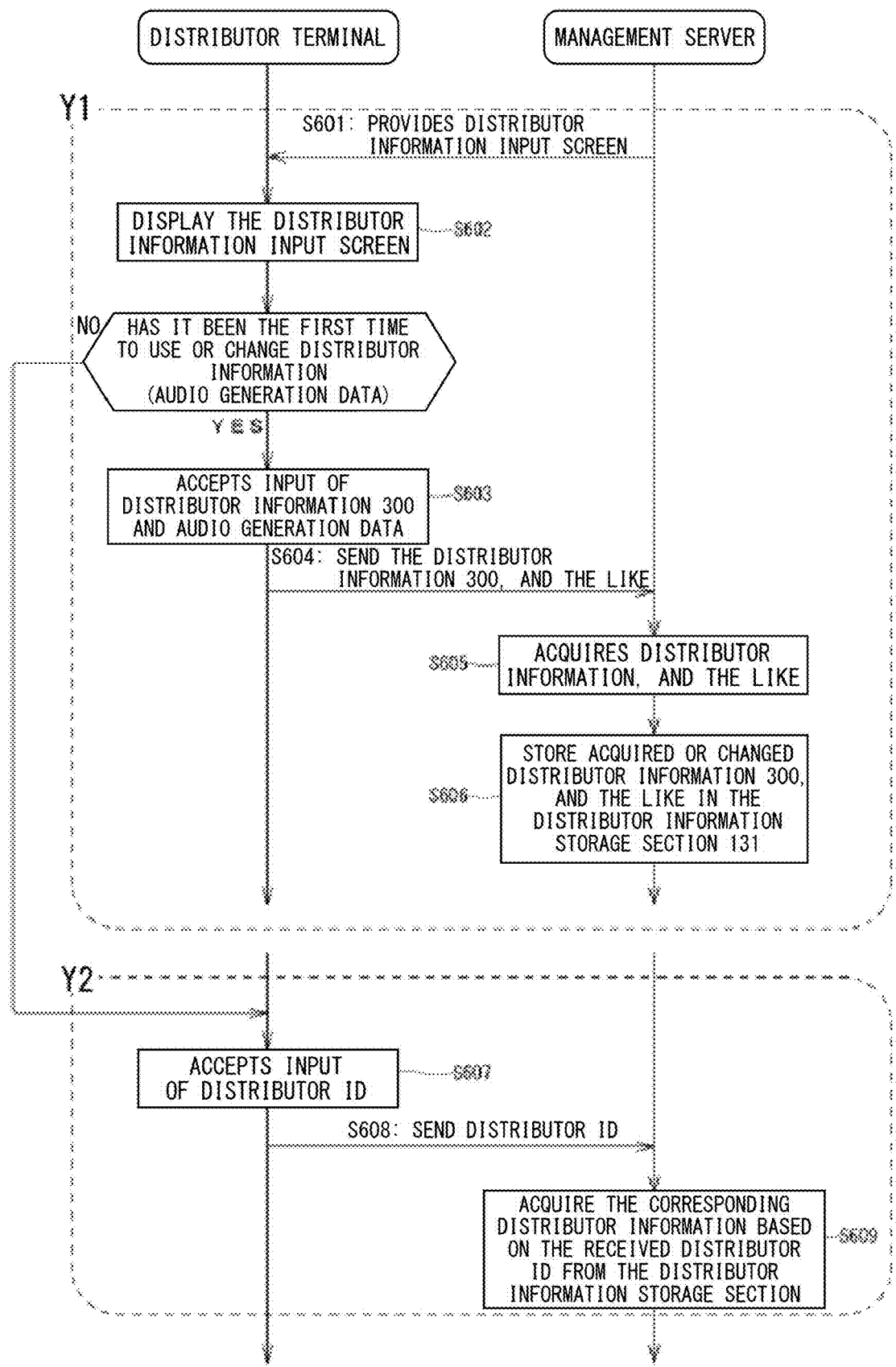
FIG. 6 A drawing that shows an overview of the distributor information acquisition process and distributor information storage process in one embodiment of the present disclosure.

Within area Y1 enclosed by dashed lines in FIG. 6, an overview of the distributor information storage process performed in step S402 of FIG. 4 is shown. The following describes how the management server 120 stores the distributor information 300.

First, in step S601, the management server 120 provides the distributor information input screen to the distributor terminal 110. Next, in step S602, the distributor terminal 110 displays the distributor information input screen on its display.

Then, when the distributor uses the live screen provision system 30 for the first time or changes (updates) the distributor information 300, the distributor terminal 110 accepts input of the distributor information 300 from the distributor in step S603. Further, the distributor information 300 accepted from the distributor at this moment includes the distributor information 300. The information to be inputted by the distributor may also include login information for external accounts (e.g., SNS) or passwords.

Next, in step S604, the distributor terminal 110 sends the distributor information 300, whose input was received in step S603, to the management server 120. Next, in step S605, the management server 120 acquires the distributor information 300 by receiving the distributor information 300 sent in step S604.

Next, in step S606, the control circuit 120A of the management server 120 attaches a distributor ID to the acquired or changed distributor information 300 and stores the distributor information 300, whose input was accepted in step S603, in the distributor information storage section 131.

<Distributor Information Acquisition Process>

Within area Y2 enclosed by dashed lines in FIG. 6, an overview of the distributor information acquisition process performed in step S402 of FIG. 4 is shown. The following describes how the management server 120 acquires the distributor information 300.

When the distributor uses the live screen provision system 30 for the second time or subsequent time, the distributor terminal 110 accepts input of the distributor ID from the distributor in step S607. Further, the distributor ID is included in the distributor information 300. Next, in step S608, the distributor terminal 110 sends the distributor ID, whose input was accepted in step S607, to the management server 120.

Then, in step S609, the management server 120 acquires the distributor information 300, which corresponds to the key of the distributor ID sent in step S608, from the distributor information storage section 131.

<Distribution Audio>

FIG. 7 is a drawing that shows an overview of distribution audio 800 in one embodiment of the present disclosure. FIG. 7A shows an overview of a plan view of a stage and venue when the video to be distributed is a live concert, for example. As shown in FIG. 7A, the venue 700 is equipped with a microphone 710 in the stage portion and a camera 720 in the audience portion. Then, in the venue 700, an amplifier speaker 730 is installed at a predetermined location. The venue 700 is the filming subject of the camera 720. The microphone 710 may be installed in the audience portion. The camera 720 may be installed in the stage portion.

As shown in FIG. 7, for example, camera Ct films the entire stage, while camera Cg films a close-up of the guitarist. The microphone for Vo 10 collects the vocal sound, and the microphone for Gt 11 collects the guitar sound. Thus, by installing each microphone 710 and camera 720 at predetermined positions in the venue 700, the management server 120 can film each performer with a close-up and collect different sounds for each performer. The management server 120 can also acquire microphone position information and camera position information.

FIG. 7B shows the camera position information for each camera Cb, Cg, and Ct, the distance to each microphone (Ln), the audio track coefficient (a), and the distribution audio 800.

Figure 7C:
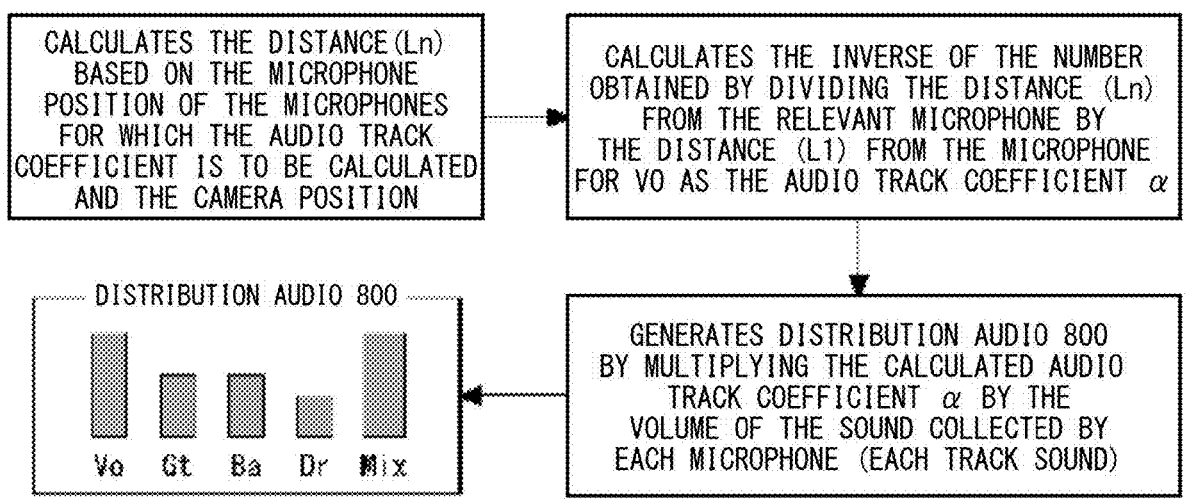
FIG. 7C A drawing that shows an overview of the process of calculating the distribution audio.

As shown in FIG. 7B, for example, when the camera Ct has a distance L1 to the microphone for Vo 10 of "3.0 m" and a distance L2 to the microphone for Gt 11 of "5.0 m," if the audio track coefficient α of the microphone for Vo 10 is "1.00," the value of the audio track coefficient α for sound collected by the microphone for Gt 11 is calculated to be "0.6". In other words, the farther the distance from the camera to the microphone, the smaller the audio track coefficient. The audio track coefficients α are also calculated for cameras Cb and Cg in the same way. FIG. 7C shows an overview of the flow of the management server 120 to generate distribution audio 800. The data necessary to calculate the audio track coefficient α is stored in advance in the distribution audio generation section 140 or in a memory section, which is not illustrated.

First, the management server 120 calculates the distance (Ln) based on the microphone position of the microphone 710 for which the audio track coefficient α is to be calculated and the camera position. Then, the management server 120 calculates the reciprocal of the number obtained by dividing the distance Ln from the relevant microphone 710 by the distance L1 from the microphone for Vo as the audio track coefficient α.

The calculation method of the audio track coefficient α is not limited to the above. For example, the audio track coefficient α may be calculated by multiplying "the reciprocal of the number obtained by dividing the distance Ln by the distance L1" by a further predetermined constant.

Next, the management server 120 multiplies the calculated audio track coefficient α by the volume of the sound collected by each of the microphones 10, 11, 12, 13. By mixing the individual track sounds obtained from this process, the management server 120 generates distribution audio 800.

As shown in FIG. 7B and FIG. 7C, for example, the distribution audio 800 (Ht) for the camera Ct has the highest volume for "Vo", followed by "Gt" and "Ba", with the lowest volume mix for "Dr". This is because the position of camera Ct is closest to the microphone for Vo, followed by the microphone for Gt and the microphone for Ba, and farthest from the microphone for Dr. In other words, the management server 120 generates audio, which approximates the volume balance of each instrument actually heard at the position of camera Ct, as the distribution audio 800. For cameras Cb and Cg, audio 800 for distribution is generated in the same way. The closer the distance between the camera and the microphone, the louder the volume.

Thus, the management server 120 can generate the live concert audio that can actually be heard at each position of cameras Cb, Ct, and Cg of cameras 720, respectively, as the distribution audio 800.

<Distribution Audio Generation Process>

Figure 8:
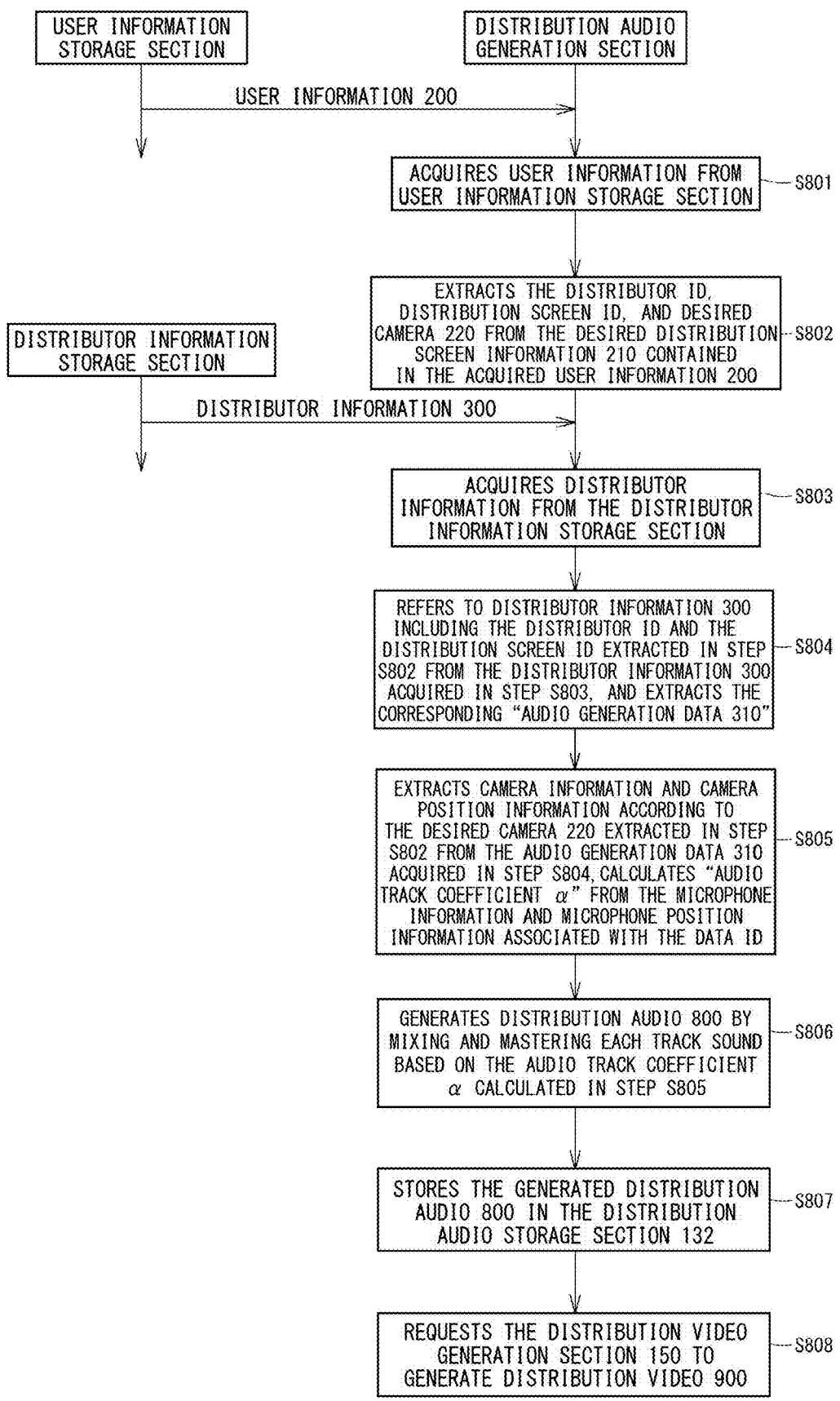
FIG. 8 A flowchart that shows an overview of the distribution audio generation process in one embodiment of the present disclosure.

FIG. 8 is a drawing that shows an overview of the distribution audio generation process performed in step S403 of FIG. 4. First, in step S801, the distribution audio generation section 140 of the management server 120 acquires the user information 200 from the user information storage section 130.

Next, in step S802, the distribution audio generation section 140 extracts the distributor ID, distribution screen ID, and desired camera 220 from the desired distribution screen information 210 contained in the user information 200 acquired in step S801.

Next, in step S803, the distribution audio generation section 140 acquires the distributor information 300 from the distributor information storage section 131. Next, in step S804, the distribution audio generation section 140 refers to distributor information 300 including the distributor ID and the distribution screen ID extracted in step S802 from the distributor information 300 acquired in step S803, and extracts the corresponding audio generation data 310.

Next, in step S805, the distribution audio generation section 140 extracts camera information and camera position information according to the desired camera 220 extracted in step S802 from the audio generation data 310 acquired in step S804, calculates audio track coefficient α from the microphone information and the microphone position information associated with the data ID.

Specifically, first, the distribution audio generation section 140 calculates the distance (Ln) based on the microphone position of the microphone 710 for which the audio track coefficient α is to be calculated and the camera position. Next, the distribution audio generation section 140 calculates the reciprocal of the number obtained by dividing the distance Ln from the microphone 710 concerned by the distance L1 from the microphone for Vo 10 as the audio track coefficient α.

The calculation method of the audio track coefficient α is not limited to the above. For example, the audio track coefficient α may be calculated by multiplying "the reciprocal of the number obtained by dividing the distance Ln by the distance L1" by a further predetermined constant.

Next, in step S806, the distribution audio generation section 140 generates distribution audio 800 by mixing and mastering each track sound based on the audio track coefficient α calculated in step S805.

Specifically, the distribution audio generation section 140 multiplies the calculated audio track coefficient α by the volume of the sound collected by each microphone. The distribution audio generation section 140 generates distribution audio 800, by mixing or otherwise processing each track sound obtained in this way, the distribution audio generation section 140 generates distribution audio 800.

Next, in step S807, the distribution audio generation section 140 stores the distribution audio 800 generated in step S806 in the distribution audio storage section 132. Next, in step S808, the distribution audio generation section 140 requests the distribution video generation section 150 to generate distribution video 900.

<Distribution video Generation Process>

Figure 9:
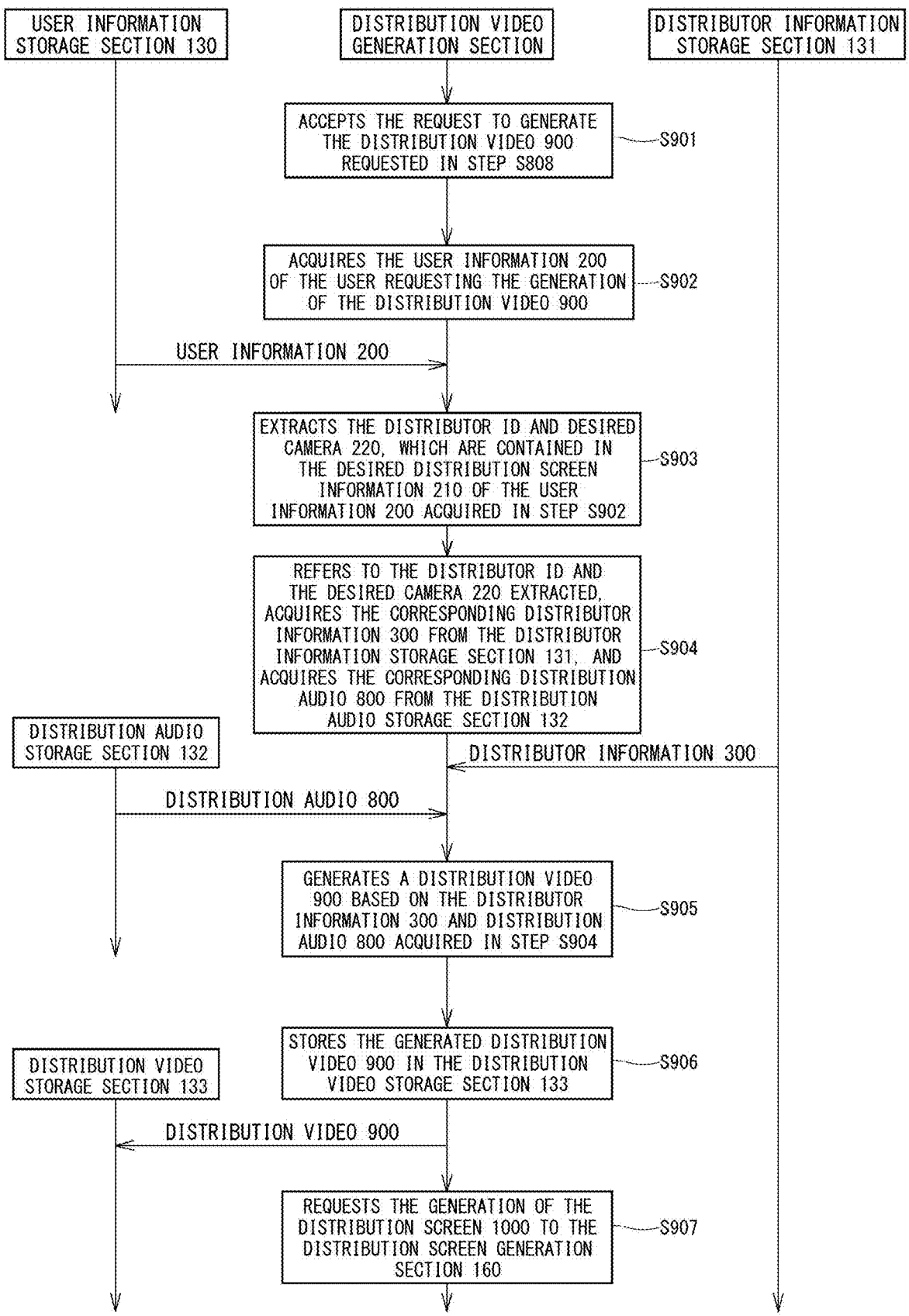
FIG. 9 A flowchart that shows an overview of the distribution video generation process in one embodiment of the present disclosure.

FIG. 9 is a drawing that shows an overview of the distribution video generation process performed in step S404 of FIG. 4. First, in step S901, the distribution video generation section 150 of the management server 120 accepts the request to generate the distribution video 900 requested in step S808.

Next, in step S902, the distribution video generation section 150 acquires the user information 200 of the user requesting the generation of the distribution video 900 from the user information storage section 130.

Next, in step S903, the distribution video generation section 150 extracts the distributor ID and desired camera 220, which are contained in the desired distribution screen information 210 of the user information 200 acquired in step S902.

Next, in step S904, the distribution video generation section 150 refers to the distributor ID extracted in step S903 and the desired camera 220, acquires the corresponding distributor information 300 from the distributor information storage section 131, and acquires the corresponding distribution audio 800 from the distribution audio storage section 132.

For example, when the distributor ID is "B0001" and the desired camera 220 is "Camera Ct", the distribution video generation section 150 acquires the distribution audio 800 of Camera Ct for the distributor whose distributor ID is B0001. Next, in step S905, the distribution video generation section 150 generates a distribution video 900 based on the distributor information 300 and the distribution audio 800 acquired in step S904.

Specifically, the distribution video 900 is generated by referring to the video generation data contained in the distributor information 300 and by delivering the distribution audio 800 corresponding to the desired camera 220 with synchronizing with the video. Next, in step S906, the distribution video generation 150 stores the distribution video 900, which is generated in step S905, in the distribution video storage section 133.

Next, in step S907, the distribution video generation section 150 requests the distribution screen generation section 160 to generate the distribution screen 1000.

<Distribution Screen>

Figure 10:
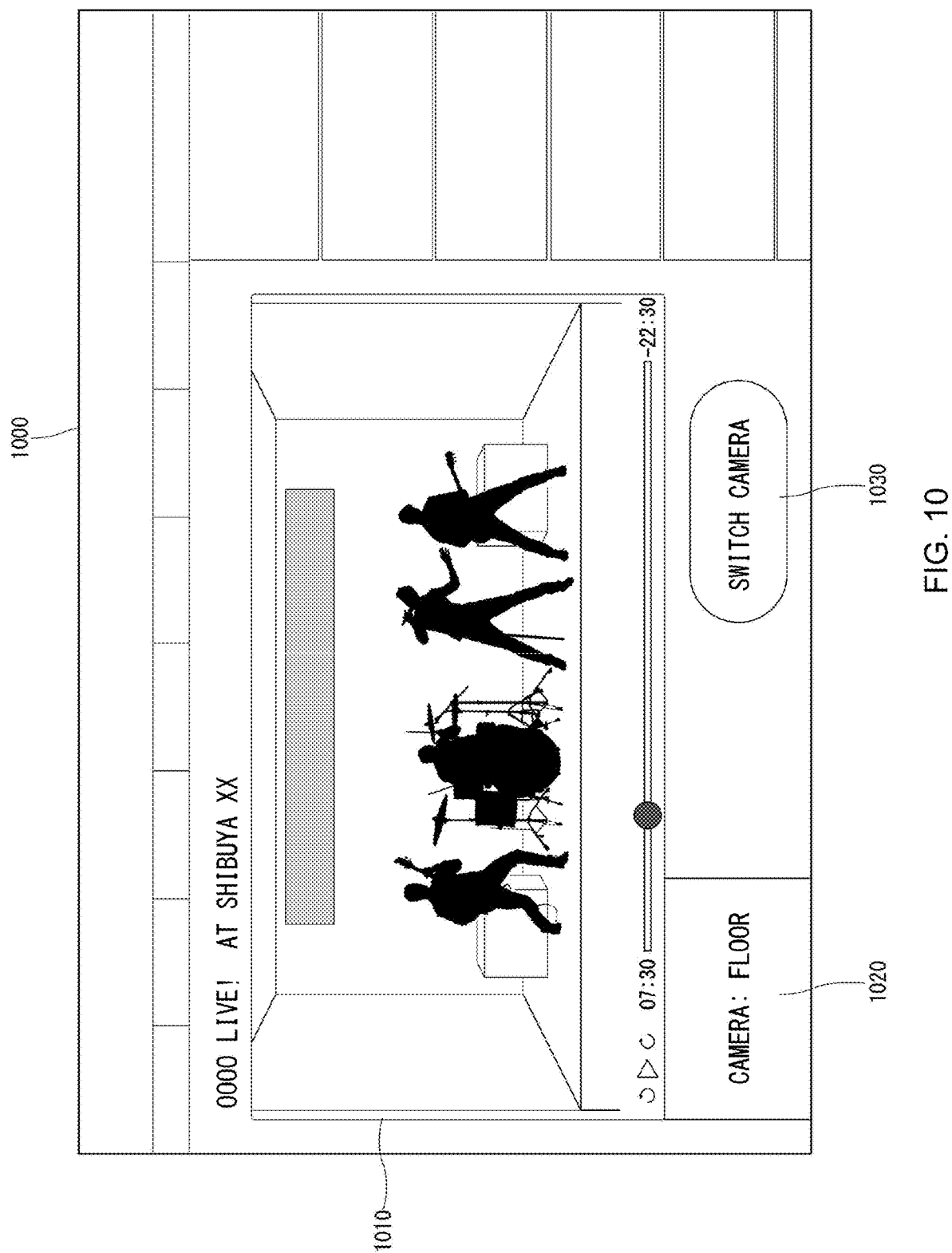
FIG. 10 A drawing that shows an overview of the distribution screen in one embodiment of the present disclosure.

FIG. 10 is a drawing that shows an overview of the distribution screen 1000 in one embodiment of the present disclosure. As shown in FIG. 10, the distribution screen 1000 includes a video display area 1010, a desired camera display area 1020, and a video-switching tab 1030. The distribution screen 1000 is displayed on the display 100A of the user terminal 100.

The video display area 1010 displays the contents of the distribution video 900. The way to display the video display area 1010 is not specially limited.

The desired camera display area 1020 displays the contents of the desired camera 220 selected by the user. For example, when the user desires to view a video filming the entire stage, the desired camera 220 is "Camera Ct" and the desired camera display area 1020 is displayed with a name such as "Floor". "Floor" is the name corresponding to "Camera Ct". The way to display the desired camera display area 1020 is not specially limited.

The desired camera display area 1020 has a function for the user to select the desired camera when the user desires to switch the video displayed on the provided distribution screen 1000. In other words, a plurality of cameras Cb, Ct, and Cg are displayed in the desired camera display area 1020, from which the user can select the desired camera.

The video-switching tab 1030 indicates a tab for notifying the management server 120 of video-switching instructions when the user desires to switch the video displayed on the provided distribution screen 1000. In other words, by the video-switching tab 1030 receiving a tap or click input from the user, the management server 120 notifies the management server 120 of the video-switching instruction.

Thus, the management server 120 can provide a distribution screen 1000 that delivers the live concert audio being actually audible at the respective positions of cameras Cb, Cg, and Ct among the cameras 720, along with the videos corresponding to the positions of those cameras for the user terminal 100.

<Distribution screen Generation Process>

Figure 11:
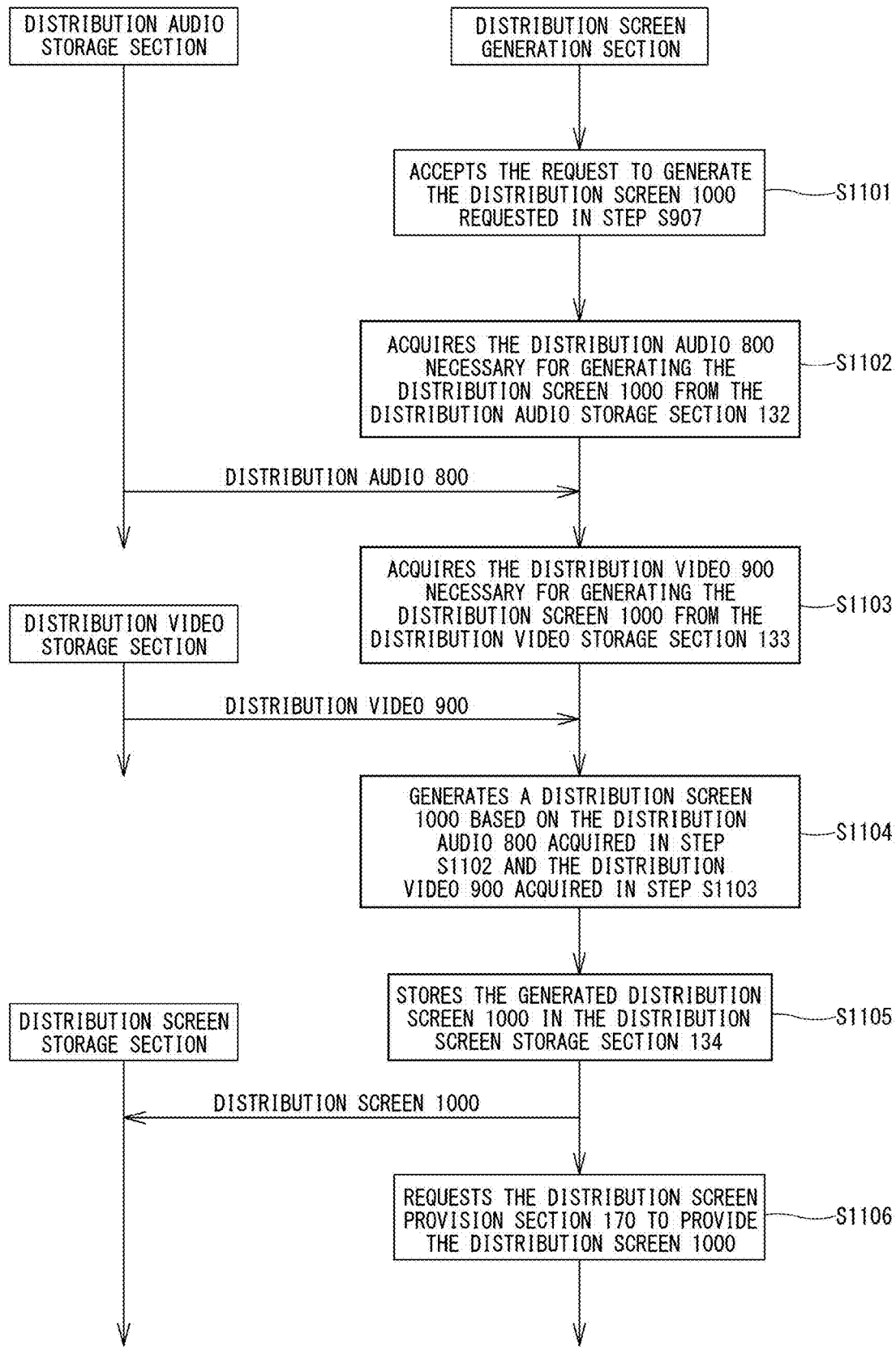
FIG. 11 A flowchart that shows an overview of the distribution screen generation process in one embodiment of the present disclosure.

FIG. 11 is a drawing that shows an overview of the distribution screen generation process performed in step S405 of FIG. 4. First, in step S1101, the distribution screen generation section 160 of the management server 120 accepts the request to generate the distribution screen 1000 requested in step S907.

Next, in step S1102, the distribution screen generation section 160 acquires the distribution audio 800, which is necessary for generating the distribution screen 1000, from the distribution audio storage section 132.

Next, in step S1103, the distribution screen generation section 160 acquires the distribution video 900, which is necessary for generating the distribution screen 1000, from the distribution video storage section 133. Next, in step S1104, the distribution screen generation section 160 generates a distribution screen 1000 based on the distribution audio 800 acquired in step S1102 and the distribution video 900 acquired in step S1103.

Next, in step S1105, the distribution screen generation section 160 stores the distribution screen 1000, which is generated in step S1104, in the distribution screen storage section 134. Next, in step S1106, the distribution screen generation section 160 requests the distribution screen provision section 170 to provide the distribution screen 1000.

<Distribution screen Provision Process>

Figure 12:
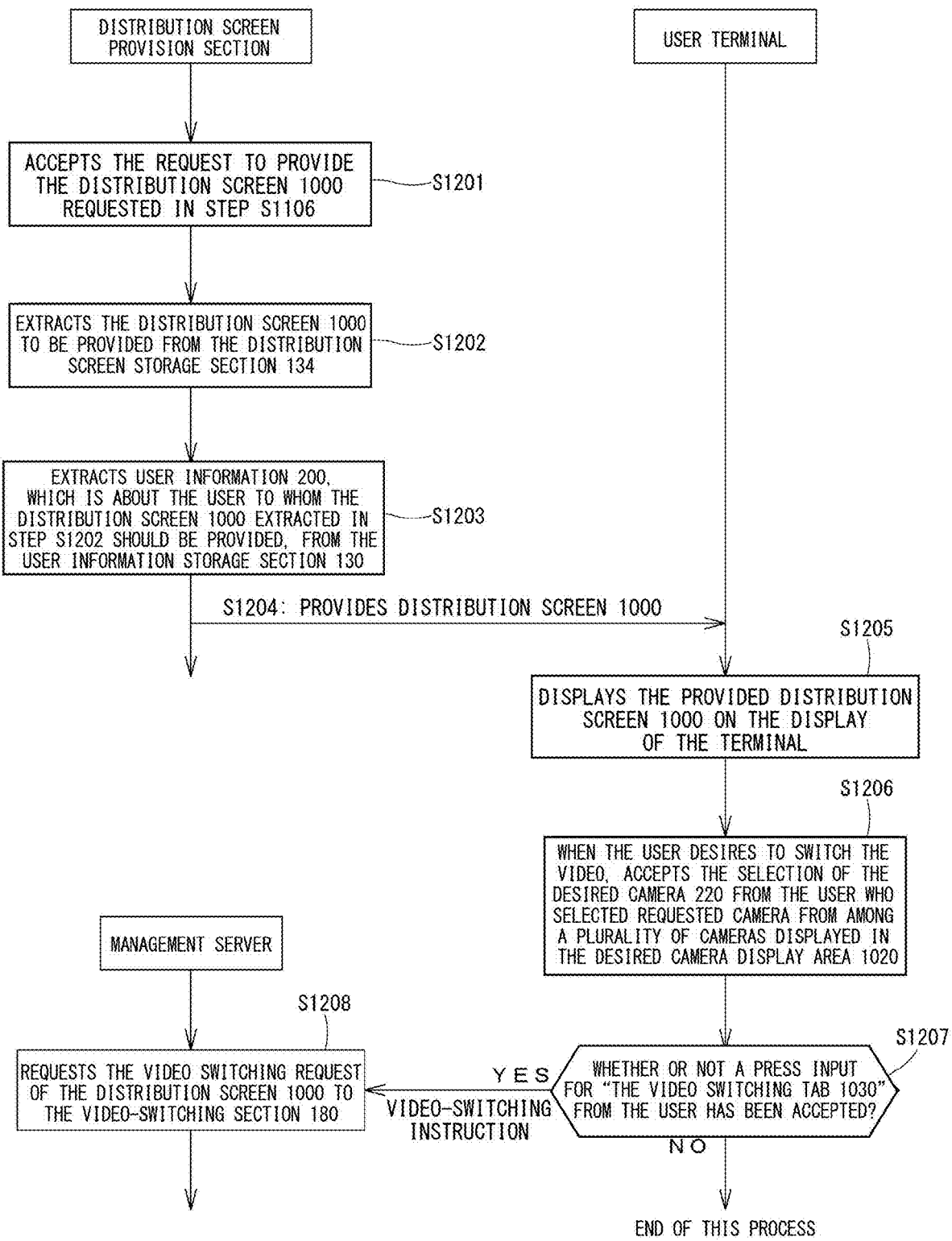
FIG. 12 A flowchart that shows an overview of the distribution screen provision process in one embodiment of the present disclosure.

FIG. 12 is a drawing that shows an overview of an example configuration of the distribution screen provision process performed in step S406 of FIG. 4. First, in step S1201, the distribution screen provision section 170 of the management server 120 accepts the request to provide the distribution screen 1000 requested in step S1106.

Next, in step S1202, the distribution screen provision section 170 extracts the distribution screen 1000, which is for provision, from the distribution screen storage section 134. Next, in step S1203, the distribution screen provision section 170 extracts user information 200, which is about the user to whom the distribution screen 1000 extracted in step S1202 should be provided, from the user information storage section 130.

Next, in step S1204, the distribution screen provision section 170 provides the distribution screen 1000 to the user terminal 100. Next, in step S1205, the user terminal 100 displays the distribution screen 1000, which is provided by the management server 120 in step S1204, on the display 100A.

Next, in step S1206, when the user desires to switch the video displayed on the provided distribution screen 1000, the user terminal 100 accepts the selection of the desired camera 220 from the user who selected the requested camera from among a plurality of cameras Cb, Cg, Ct displayed in the desired camera display area 1020.

Next, in step S1207, the user terminal 100 determines whether or not a press input for the video-switching tab 1030 from the user has been accepted. When the user terminal 100 determines YES in step S1207, the management server 120 performs step S1208. When the user terminal 100 determines NO in step S1207, the user terminal 100 terminates this process.

In step S1208, when the user desires to switch the video displayed on the provided distribution screen 1000, the management server 120 notifies the management server 120 of the video-switching instruction Then, the management server 120 requests the video-switching request of the distribution screen 1000 to the video-switching section 180.

Thus, the management server 120 can provide the live concert audio that can actually be heard at the position of the user's desired camera 720 (desired camera 220) along with the video corresponding to the position of the said camera to the user as a distribution screen 1000.

<Post-switching Screen>

Figure 13:
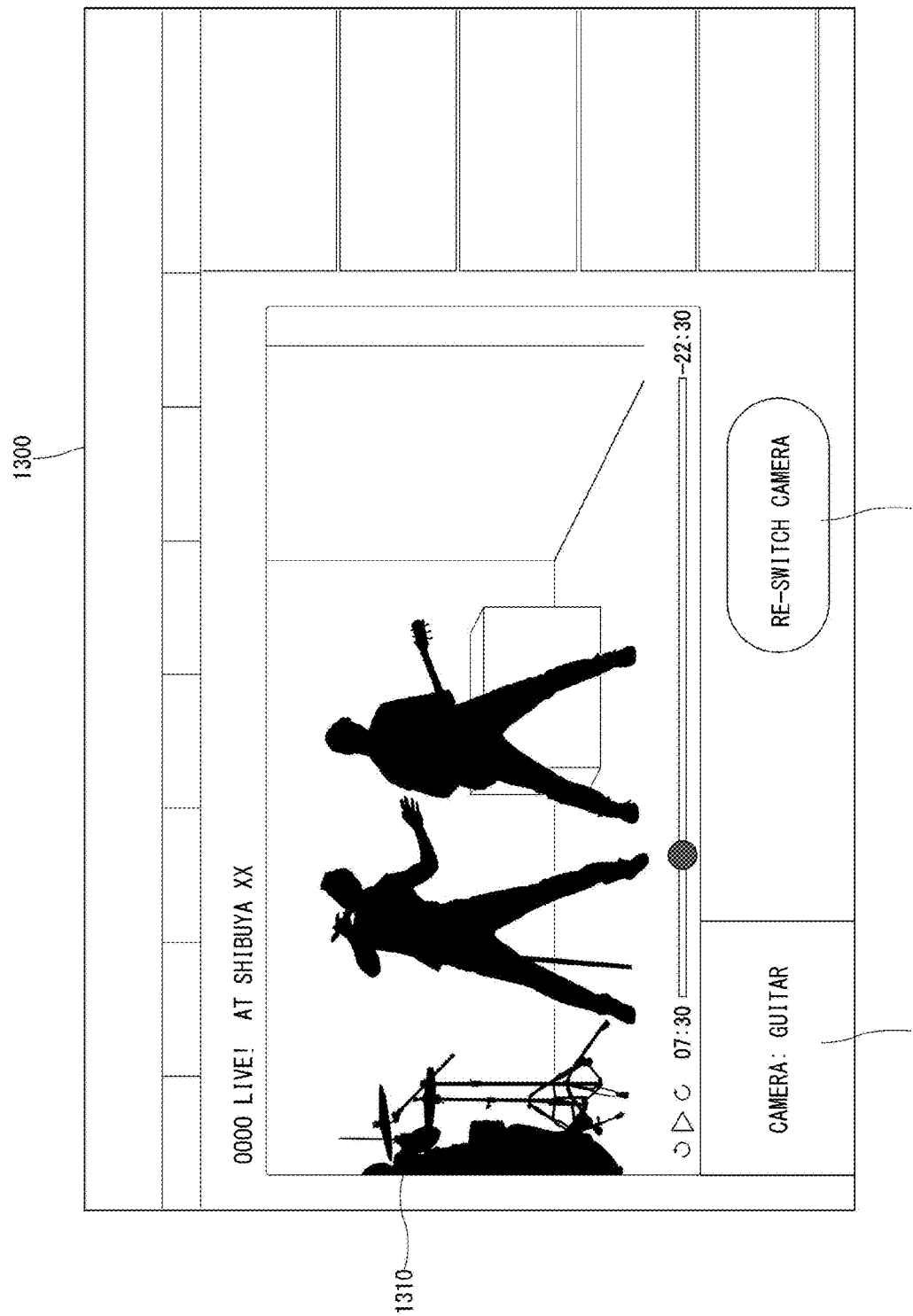
FIG. 13 A drawing that shows an overview of the post-switching screen in one embodiment of the present disclosure.

FIG. 13 is a drawing that shows an overview of the post-switching screen 1300 in one embodiment of the present disclosure. As shown in FIG. 13, the post-switching screen 1300 includes a video display area 1310, a desired camera display area 1320, and a re-switch tab 1330. The post-switching screen 1300 is displayed on the display 100A of the user terminal 100.

The video display area 1310 displays the contents of the distribution video 900 after the camera is switched. The way to display the video display area 1310 is not specially limited.

The desired camera display area 1320 displays the contents of the desired camera 220 which the user newly selected. The way to display the desired camera display area 1320 is not specially limited.

The desired camera display area 1320 has a function for the user to select the desired camera when the user desires to switch the video displayed on the post-switching screen 1320 again. In other words, a plurality of cameras is displayed in the desired camera display area 1320, from which the user can select the preferred camera.

The re-switch tab 1330 indicates a tab that notifies the management server 120 of the re-switch instructions when the user desires to re-switch the video displayed on the provided post-switch screen 1300. In other words, when the re-switching tab 1330 receives a tap or click input from the user, the management server 120 notifies the management server 120 of the re-switching instruction.

<Video-Switching Process>

Figure 14:
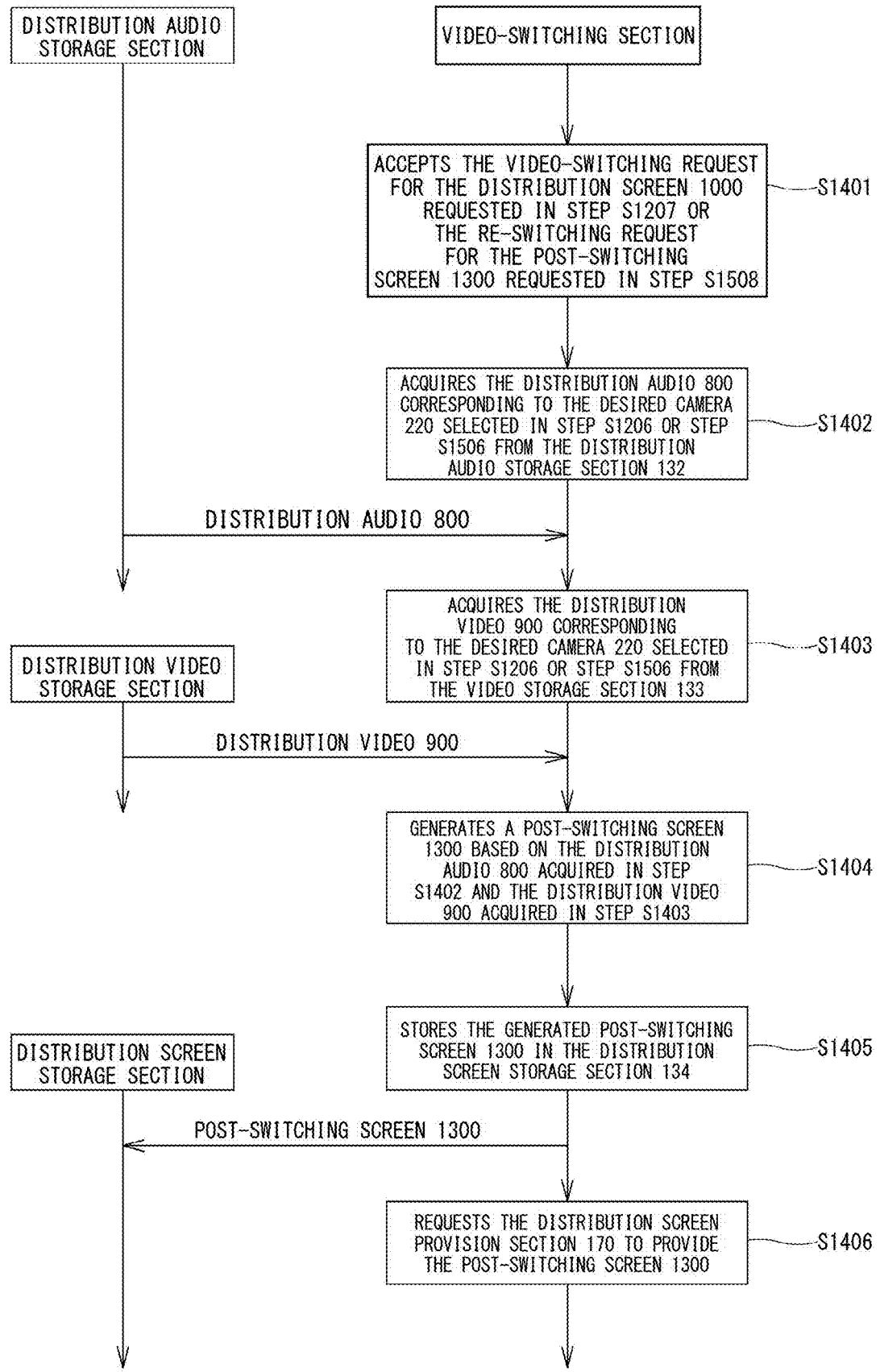
FIG. 14 A flowchart that shows an overview of the video-switching process in one embodiment of the present disclosure.

FIG. 14 is a drawing that shows an overview of the video-switching process performed in step S407 of FIG. 4. First, in step S1401, the video-switching section 180 of the management server 120 accepts the video-switching request for the distribution screen 1000 requested in step S1207 or the re-switching request for the post-switching screen 1300 requested in step S1508.

Next, in step S1402, the video-switching section 180 acquires the distribution audio 800, which corresponds to the desired camera 220 selected in step S1206 or step S1506, from the distribution audio storage section 132. Next, in step S1403, the video-switching section 180 acquires the distribution video 900, which corresponds to the desired camera 220 selected in step S1206 or step S1506, from the video storage section 133.

Next, in step S1404, the video-switching section 180 generates a post-switching screen 1300 based on the distribution audio 800 acquired in step S1402 and the distribution video 900 acquired in step S1403.

Next, in step S1405, the video-switching section 180 stores the post-switching screen 1300, which is generated in step S1404, in the distribution screen storage section 134. Next, in step S1406, the video-switching section 180 requests the distribution screen provision section 170 to provide the post-switching screen 1300.

<Post-Switching Screen Provision Process>

Figure 15:
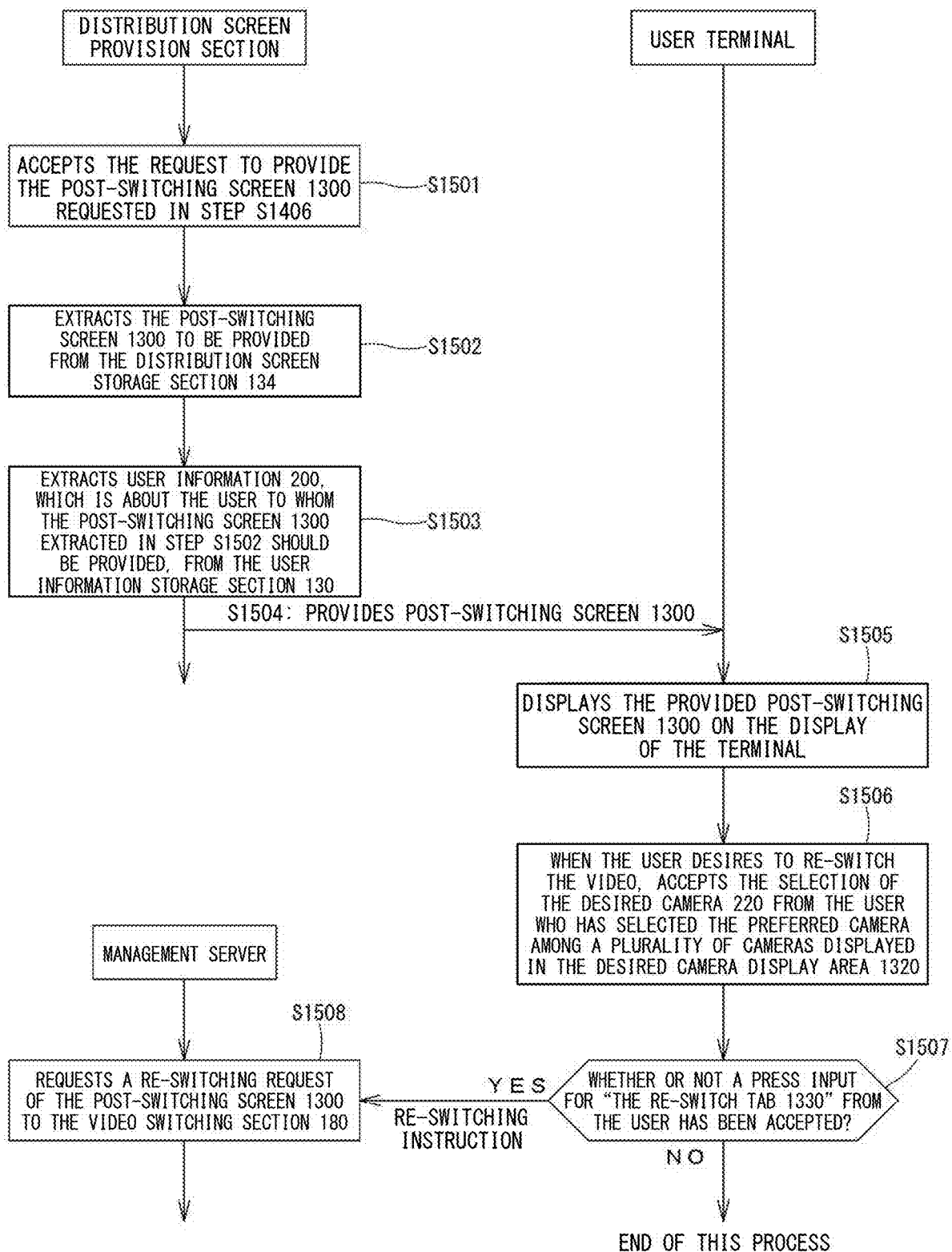
FIG. 15 A flowchart that shows an overview of the post-switching screen provision process in one embodiment of the present disclosure.

FIG. 15 is a drawing that shows an overview of the post-switching screen provision process performed in step S408 of FIG. 4. First, in step S1501, the distribution screen provision section 170 of the management server 120 accepts the request to provide the post-switching screen 1300 requested in step S1406.

Next, in step S1502, the distribution screen provision section 170 extracts the post-switching screen 1300, which is for provision, from the distribution screen storage section 134. Next, in step S1503, the distribution screen provision section 170 extracts user information 200, which is about the user to whom the post-switching screen 1300 extracted in step S1502 should be provided, from the user information storage section 130.

Next, in step S1504, the distribution screen provision section 170 provides the post-switching screen 1300 to the display 100A of the user terminal 100. Next, in step S1505, the user terminal 100 displays the post-switching screen 1300 provided by the management server 120 in step S1504 on the terminal display.

Next, in step S1506, when the user terminal 100 desires to switch the video displayed on the post-switching screen 1300, which was provided to the user, again, the user terminal 100 accepts the selection of the desired camera 220 from the user who has selected the preferred camera among a plurality of cameras displayed in the desired camera display area 1320.

Next, in step S1507, the user terminal 100 determines whether or not a press input for the re-switch tab 1330 from the user has been accepted. When the user terminal 100 determines YES in step S1507, the management server 120 performs step S1508. When the user terminal 100 determines NO in step S1507, the user terminal 100 terminates this process.

In step S1508, the management server 120 notifies the management server 120 of the re-switching instruction when the user desires to re-switch the video displayed on the provided post-switching screen 1300. Then, the management server 120 requests a re-switching request of the post-switching screen 1300 to the video-switching section 180. Then, the management server 120 proceeds to the process in step S1401 and repeats the process thereafter.

In this way, the management server 120 can follow the switching of the desired camera 220 and provide a post-switching screen 1300 with the distribution audio 800 and the distribution video 900 switched to the user.

Second Embodiment

The configuration of the live screen provision system 30 in the second embodiment is the same as in the first embodiment.

<Distribution Audio>

The distribution audio 810 in this embodiment is employed the monitor sound of the performer performing on stage, or the sound collected by the wearable microphone worn by the performer as it is. In other words, the distribution audio 810 in this embodiment is not generated by using camera position, microphone position, and audio track coefficients as shown in FIG. 7.

Thus, the management server 120 can provide the audio of the live concert actually heard by the performer filmed in close-up by the desired camera 720 (desired camera 220), which the user desires, along with the video corresponding to the location of the said camera as a distribution screen 1000 to the user.

For example, when the user desires a video of a bassist in close-up, the user can watch and hear the "sound the bassist hears on stage" along with the said video, allowing the user to stand on stage as if the user were the bassist and simulate the sound heard there.

Third Embodiment

The configuration of the live screen provision system 30 in the third embodiment is the same as in the first and second embodiments.

In this embodiment, the audio and video for distribution are not limited to those about "live concerts". In other words, the audio and video for distribution can target any activity that is for live streaming using cameras and microphones, such as "lectures, seminars, and sports such as baseball and soccer," and the same system as in the first and second embodiments and each process according to the embodiments can be applied.

This allows the management server 120 to provide audio of sports and the like, which is actually audible at the location of the desired camera 720 (desired camera 220) desired by the user, as a distribution screen 1000 along with the video corresponding to the location of said camera.

Effects of the Present Embodiments

According to the embodiments of the present disclosure described above, the management server 120 can provide the audio of a live concert, which can actually be heard at the position of the desired camera 720 (desired camera 220) desired by the user, along with the video corresponding to the position of the said camera as a distribution screen 1000 to the user terminal 100.

The management server 120 can also provide a post-switching screen 1300 in which the distribution audio 800 and distribution video 900 are switched to follow the switching of the desired camera 220.

Thus, simply by switching the desired camera 220 in the distribution screen 1000, the user can experience the audio heard at the desired viewpoint in the live concert venue, specifically, the sound heard in a given direction and at a given position, with a sense of presence.

Fourth Embodiment

Figure 16:
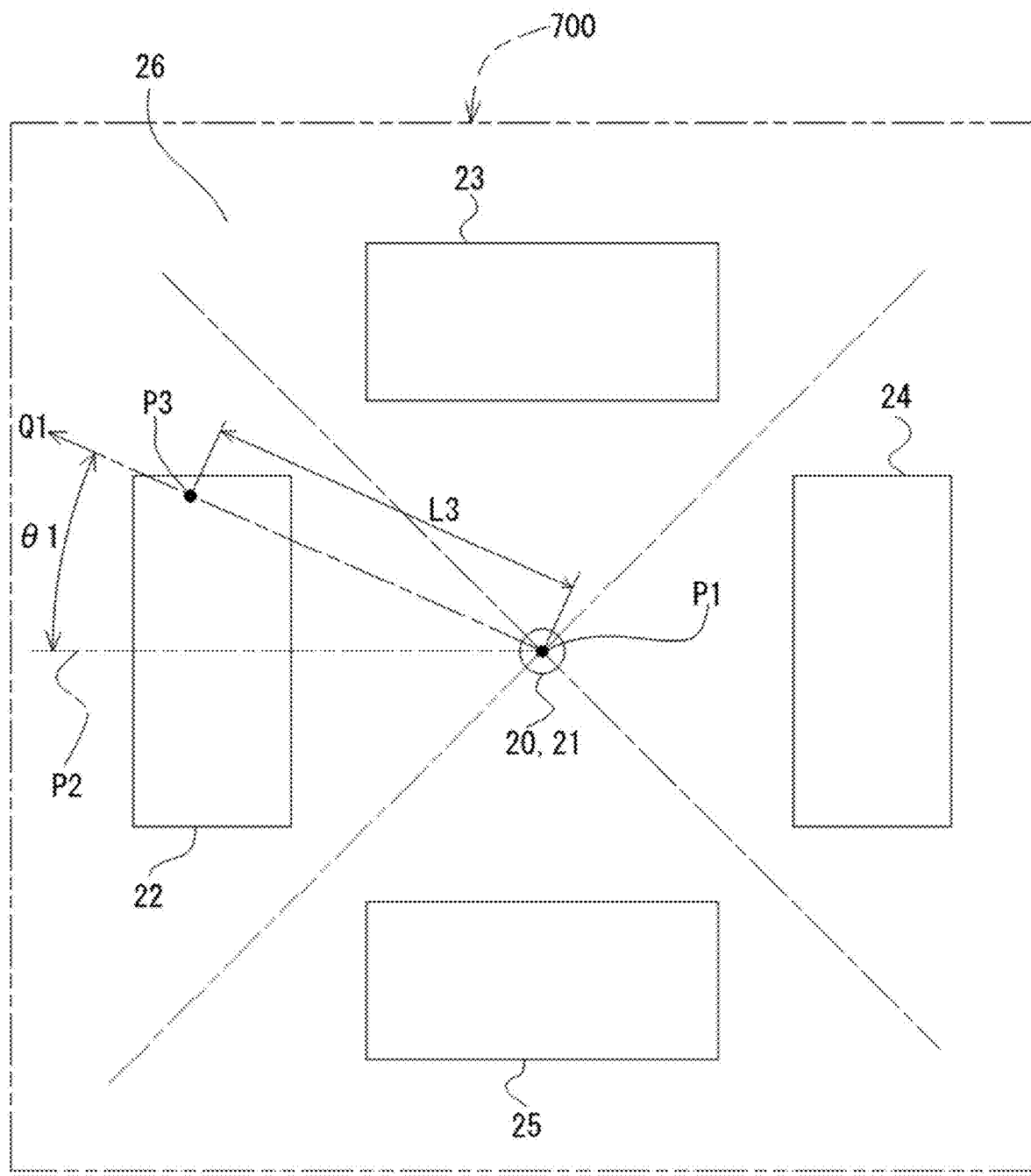
FIG. 16 A drawing that shows an overview of the post-switching screen provision process in one embodiment of the present disclosure.

FIG. 16 shows the fourth embodiment in which the live screen distribution system 30 is available. FIG. 16, for example, shows a plan view of another example of a stage and venue 700 for the video to be distributed. The venue 700 is divided into first area 22 having the audience, second area 23 having the backing band, third area 24 having the orchestra, and fourth area 25 having the choir, to surround the predetermined position P1 where the camera 20 and microphone 21 are installed. The predetermined position P1 is located in fifth area 26, which is outside of the first area 22, the second area 23, the third area 24, and the fourth area 25. Then, within a circumferential range of 360 degrees around the predetermined position P1, the first area 22, the second area 23, the third area 24, and the fourth area 25 are located within different angles. The predetermined position P1 is located in a forward direction viewed from the first area 22, the second area 23, the third area 24, and the fourth area 25.

In FIG. 16, for convenience, the first area 22 is located within an abbreviated 90-degree range on the left side centered on the predetermined position P1, the second area 23 is located within an abbreviated 90-degree range on the upper side centered on the predetermined position P1, the third area 24 is located within an abbreviated 90-degree range on the right side centered on the predetermined position P1, the fourth area 25 is located within an abbreviated 90-degree range on the lower side centered on the predetermined position P1. In the example shown in FIG. 16, the first area 22, the second area 23, the third area 24, and the fourth area 25 do not overlap each other. Furthermore, in FIG. 16, each of the first area 22, the second area 23, the third area 24, and the fourth area 25 is represented as an abbreviated rectangle in the plan view at venue 700, but could also be circular, oval, triangular, and the like. Furthermore, the positional relationship between the first area 22, the second area 23, the third area 24, and the fourth area 25 in the circumferential direction with the predetermined position P1 at the center is not limited to that shown in FIG. 16.

The camera 20 and the microphone 21 may be placed on the floor or suspended from the ceiling. The camera 20 is a 360-degree camera that films video of 360-degree in all directions centered on the predetermined position P1, converts the video into signals, and sends them to the distributor terminal 110 shown in FIG. 1. In addition, the zoom function of the camera 20 allows it to select a filming subject located at any distance from its lens among filming subjects at different distances from the lens in the same direction, and to film a video of the filming subject zoomed and clearly. The camera 20 is displayed on the display 100A of the user terminal 100 as the desired camera.

When video information is sent from the distributor terminal 110 to the management server 120, the management server 120 can calculate a clockwise angle θ1 for the direction of the video being filmed by the camera 20, specifically, the direction Q1 with angle θ1 relative to the straight line P2, within a 360-degree range centered on the camera 20. The management server 120 can calculate the distance from the camera 20 to the filming subject in the video in the direction Q1 that the camera 20 is filming. The straight line P2 is a virtual line passing through the predetermined position P1, and in FIG. 16, for convenience, it is located in the center of the first area 22, but is not limited to this position.

The microphone 21 is a super-directive 360-degree microphone and has a function of recording audio in all directions of 360 degrees in any direction centered on the predetermined position P1 and a function of recording voice within a predetermined distance range from the predetermined position P1 for each position. The distance that the microphone 21 can collect audio is determined by the sound collection capability of the microphone 21. The microphone 21 converts the recorded audio into a signal and sends it to the distributor terminal 110.

The user can select the desired position P3, for example, by changing the direction Q1 as viewed from camera 20 and the distance L3 from camera 20, by operating the video switching tab 1030 as shown in FIG. 13.

Then, when the distribution audio 800 will be generated as in FIG. 8, the management server 120 extracts the camera 20 as the desired camera 220 in step S802. Furthermore, in step S805 and step S806 of FIG. 8, the management server 120 generates distribution audio 800 by processing the video information filmed by the camera 20 and the audio information collected from the microphone 21.

Specifically, in direction Q1, distribution audio 800 at position P3 at distance L3 from camera 20 can be generated. In this case, the audio track coefficient is set to "1.00" at a predetermined distance from the predetermined position P1, and the audio track coefficient is set relatively smaller as the distance L3 is relatively larger. The same effects can be achieved in the fourth embodiment as in the other embodiments.

Although the respective embodiments of the present invention have been described above, the present invention is not limited to the aforementioned embodiments and can be modified in various ways within the scope of the gist of the present disclosure. For example, the user terminal includes any user terminals in various forms, such as notebook PCs, tablet terminals, VR (virtual reality) goggles, and the like, in addition to smartphones.

When the user terminal is VR goggles, the distribution screen 1000 in FIG. 10 is displayed with VR goggles. The functions of the desired camera display area 1020 and the image switching tab 1030 are achieved by a controller attached to the VR goggles, or by a smartphone, tablet device, and the like that can communicate with the VR goggles.

When the user terminal is VR goggles, the post-switching screen 1300 in FIG. 13 is displayed with VR goggles. The functions of the desired camera display area 1320 and the re-switch tab 1330 are accomplished by a controller attached to the VR goggles, or by a smartphone, tablet device, and the like that can communicate with the VR goggles.

In addition, the foregoing embodiments are set forth in detail to describe the present disclosure in an easy-to-understand manner, and shall not be necessarily limited to those having all configurations which were described. Further, for one embodiment, it is possible to replace some of a configuration thereof with a configuration of another embodiment, it is also possible to add the configuration of another embodiment to the configuration thereof. Further, for one embodiment, it is possible to add, remove, or replace some of a configuration thereof with another configuration.

Further, each configuration, function, and processing unit described above may be partially or entirely implemented via hardware (e.g., integrated circuits). Further, each configuration, function, and processing unit described above may be implemented via software, including installation-type software stored in disk and other storage media or provided via a network, executed in the processor, or via network-type applications such as ASP. Programs, tables, files, and other information for implementing each function can be stored in memory, hard disks, SSD (Solid State Drive), or other storage devices, or in IC cards, SD cards, DVDs, or other storage media.

Further, the video to be filmed by the camera may be sports, drama, and the like. For example, it is possible to install a camera and microphone at a specified position in a baseball stadium, the cheering section, benches, infield, outfield, back of the net, and the like to be a filming subject of the camera, and process the video and audio in the direction to the camera and at a specified distance from the camera to provide to the user terminal. The distributor terminal may be located at either the baseball stadium or the TV station. Further, in long-distance relay races or marathon races, it is possible to mount a camera and microphone on a relay vehicle, to make the front, the rear, and the like of the relay vehicle a filming subject, and to provide the sound of the filming subject to the user terminal. The distributor terminal may be installed in either the relay vehicle or the TV station.

Further, when a drama is performed on the main stage set up in the venue 700, the location of the main stage differs from the location of the backyard and dressing rooms. And the following staging may take place as a scene may transition from a situation in which a given scene on the main stage is filmed by camera 20 and audio is acquired by microphone 21 to the next, and some of the performers' voices can be heard from their dressing rooms next morning, or from the sleeves in the back yard. In such a case, the target position to be filmed by camera 20 can be switched from the main stage to the backstage or backyard sleeve, and the microphone 21 can be switched to acquire its sound. Thus, by switching the position from which the camera 20 films, a user viewing the display 100A on the user terminal 100 can be impressed, "Actually, this is what was done." and can be impressed.

The user can also select a position within any of the second area 23, the third area 24, and the fourth area 25 as the position of the filming subject. The predetermined position P1 may be located within the fifth area 26. In this case, the predetermined position P1 may be located in any of the spaces between the first area 22 and the second area 23, between the second area 23 and the third area 24, between the third area 24 and the fourth area 25, and between the fourth area 25 and the first area 23. Further, the predetermined position P1 may be located in any of the spaces behind the first area 22, behind the second area 23, behind the third area 24, and behind the fourth area 25.

Further, the camera 20 and microphone 21 may be positioned in different positions in the plan view of the venue 700 shown in FIG. 16. In this case, once the positional relationship between the camera 20 and the microphone 21 and the distance between the camera 20 and the microphone 21 are determined, the distribution video generation process can be performed in step S404 of FIG. 4 by matching the position of the filming subject and the audio at the filming subject position.

An example of the technical meaning of the matters described in this disclosure is as follows: camera 20 is an example of a desired camera; control circuit 120A is an example of a camera extraction section, audio extraction section, and video extraction section. The position P3 is an example of a filming subject. The filming subject can also be defined as the filming target. The audio track coefficient is an example of predetermined coefficients. The camera 20 is an example of a 360-degree camera and microphone 21 is an example of a 360-degree microphone. The microphone for Vo 10 is an example of a vocal microphone.

INDUSTRIAL APPLICABILITY

The management server of this disclosure can be used in the field of providing video and audio to user terminals.

DESCRIPTION OF THE REFERENCE NUMERALS

100 . . . User terminal
110 . . . Distributor terminal
120 . . . Management server
130 . . . User information storage section
131 . . . Distributor information storage section
132 . . . Distribution audio storage section
133 . . . Distribution video storage section
134 . . . Distribution screen storage section
140 . . . Distribution audio generation section
150 . . . Distribution video generation section
160 . . . Distribution screen generation section
170 . . . Distribution screen provision section
180 . . . Video-switching section
200 . . . User information
300 . . . Distributor information
800 . . . Distribution audio
900 . . . Distribution video
1000 . . . Distribution screen
1300 . . . Post-switching screen

The invention claimed is:

1. A management server that is connected to a user terminal and a distributor terminal via a network, the management server comprises:
   a camera extraction section receiving a desired camera, which is selected by a user by operating the user terminal, from the user terminal;
   an audio extraction section receiving audio generation data, which is audio acquired by microphones of audio corresponding to a filming subject to be filmed by the desired camera, from the distributor terminal;
   a video extraction section receiving video generation data, which corresponds to the filming subject, from the distributor terminal;
   a distribution audio generation section generating distribution audio to be distributed to the user terminal by calculating a distance from the desired camera to the filming subject and multiplying the voice generation data by a coefficient determined according to the distance;
   a distribution video generation section generating distribution video to be distributed to the user terminal based on the video of the filming subject and the distribution audio;
   wherein:
   the desired camera is a camera that Is selected by operation of the user terminal from among a plurality of cameras capable of filming each of the filming subjects at different positions;
   the microphones include a plurality of microphones that can acquire audio from each of the filming subjects at different positions, wherein the microphones include vocal and non-vocal microphones, and
   the distribution audio generation section generates the distribution audio by calculating each of distances from the desired camera to each of the microphones based on position Information of the desired camera and position Information of each of the plurality of the microphones, calculating the specified coefficient that is a reciprocal of a quotient obtained by dividing distance from the desired camera to the non-vocal microphones included in the microphones by the distance from the desired camera to the vocal microphones, and mixing each of track sounds obtained by multiplying the volume of the track sounds collected by each of microphones by the specified coefficient.

2. The management server according to claim 1, the management server comprises:
   a distribution screen generation section generating a distribution screen based on the distribution audio and the distribution video; and
   a distribution screen provision section providing the generated distribution screen to the user terminal.

3. The management server according to claim 2, the management server comprises:

a video-switching section generating a post-switching screen based on the distribution audio and the distribution video corresponding to the desired camera newly selected by the user when the user terminal receives a pressing input on a video switch tab, which is contained in the distribution screen, from a user,
wherein the distribution screen provision section provides the generated post-switching screen to the user terminal.

4. The management server according to claim 3, wherein:
the video-switching section newly generates the post-switching screen based on the distribution audio and the distribution video corresponding to the desired camera newly selected by the user when the user terminal receives a pressing input from the user for the re-switch tab, which is contained in the post-switching screen.

5. The management server according to claim 1, wherein:
the distributor terminal is connected to the desired camera and connected to a microphone that acquires audio generated by the filming subject,
the desired camera includes a 360-degree camera capable of filming the filming subject that exists within a 360-degree range in a circumferential direction centered at a predetermined position,
the microphones include a 360-degree microphone that can acquire audio generated at the filming subject that exists within a 360-degree range in a circumferential direction centered at the predetermined position.

* * * * *